US006842442B2

(12) United States Patent
Okawa et al.

(10) Patent No.: US 6,842,442 B2
(45) Date of Patent: Jan. 11, 2005

(54) DS-CDMA TRANSMISSION METHOD

(75) Inventors: Koichi Okawa, Yokohama (JP); Koji Ohno, Yokohama (JP); Mamoru Sawahashi, Yokohama (JP); Shinji Uebayashi, Yokosuka (JP); Yukihiko Okumura, Yokohama (JP)

(73) Assignee: NTT Mobile Communications Network, Inc., Tokyo (JP)

( * ) Notice: Subject to any disclaimer, the term of this patent is extended or adjusted under 35 U.S.C. 154(b) by 0 days.

(21) Appl. No.: 09/218,521

(22) Filed: Dec. 22, 1998

(65) Prior Publication Data

US 2003/0031195 A1 Feb. 13, 2003

Related U.S. Application Data

(62) Division of application No. 08/865,591, filed on May 29, 1997, now Pat. No. 6,097,711.

(30) Foreign Application Priority Data

May 30, 1996 (JP) .............................................. 8-136615
Aug. 14, 1996 (JP) .............................................. 8-214496

(51) Int. Cl.[7] .............................................. H04B 7/216
(52) U.S. Cl. ....................... 370/335; 370/342; 375/130; 375/142; 375/146; 375/147
(58) Field of Search ................................ 370/335, 342; 375/130, 146, 147, 141, 142; 455/448

(56) References Cited

U.S. PATENT DOCUMENTS

| 4,742,517 | A | 5/1988 | Takagi et al. |
| 4,769,819 | A | 9/1988 | Matsutani et al. |
| 5,442,625 | A | 8/1995 | Gitlin et al. |
| 5,442,662 | A | 8/1995 | Fukasawa et al. .......... 370/342 |

(List continued on next page.)

FOREIGN PATENT DOCUMENTS

| EP | 0 716 520 | 6/1996 |
| EP | 0 721 264 | 7/1996 |
| JP | 63-121332 | 5/1988 |
| JP | 08-65273 | 3/1996 |
| JP | 08-191289 | 7/1996 |
| JP | 9-8770 | 1/1997 |
| WO | WO93/15573 | 8/1993 |
| WO | WO96/00470 | 1/1996 |
| WO | WO96/00471 | 1/1996 |

OTHER PUBLICATIONS

Adachi et al., "Coherent Multicode DS–CDMA Mobile Radio Access for Next Generation System," Technical Report of IEICE, vol. 95, No. 312, RCS95–78, Oct. 1995, pp. 7–12.
Official Notice of Final Decision for Rejection to corresponding Japanese Patent Application No. Hei 08–214496, Sep. 20, 2002.
Wide–band services in a DS–CDMA based FPLMTS system, Dahlman et al., IEEE VTC '96, Apr. 28–May 1, 1996, 46th Vehicular Technology Conference, Proceedings vol. 3.

*Primary Examiner*—Chi Pham
*Assistant Examiner*—Thai D Hoang
(74) *Attorney, Agent, or Firm*—Brown Rayman Millstein Felder & Steiner LLP

(57) ABSTRACT

A DS-CDMA transmission method capable of improving the accuracy of channel estimation using pilot symbols by eliminating cross-correlation between pilot symbols inserted into code channels in CDMA multiplexing carrying out fast signal transmission. In each frame assembler, the pilot symbols, which are used for channel estimation for coherent detection, are inserted into coded information data on code channels at fixed intervals, and then the data is modulated by the modulator. The modulated data symbols in each code channel from the modulator are spread by the spreading modulator, the pilot symbols are spread using a spreading code, whereas the information symbols are spread using different spreading codes assigned to respective code channels. The spread signals of the code channels are summed up by the adder to be transmitted.

6 Claims, 23 Drawing Sheets

U.S. PATENT DOCUMENTS

| | | | |
|---|---|---|---|
| 5,515,396 A | | 5/1996 | Dalekotzin .................. 375/200 |
| 5,533,013 A | * | 7/1996 | Lepanen ..................... 370/342 |
| 5,715,236 A | | 2/1998 | Gilhousen et al. .......... 370/209 |
| 5,724,378 A | * | 3/1998 | Miki et al. .................. 375/200 |
| 5,745,520 A | * | 4/1998 | Love et al. .................. 375/200 |
| 5,790,588 A | | 8/1998 | Fukawa et al. ............. 375/200 |
| 5,805,583 A | | 9/1998 | Rakib ......................... 370/342 |
| 5,809,020 A | * | 9/1998 | Bruckert et al. ............ 370/335 |
| 5,822,359 A | | 10/1998 | Bruckert et al. ............ 375/200 |
| 5,850,393 A | | 12/1998 | Adachi ....................... 370/335 |
| 5,870,378 A | * | 2/1999 | Huang et al. ............... 370/209 |
| 5,930,230 A | * | 7/1999 | Odenwalder et al. ....... 370/208 |
| 5,940,430 A | * | 8/1999 | Love et al. ................. 375/200 |
| 5,966,376 A | * | 10/1999 | Rakib et al. ................ 370/342 |
| 6,091,757 A | * | 7/2000 | Cudak et al. ............... 375/130 |
| 6,233,231 B1 | * | 5/2001 | Felix et al. ................. 370/335 |
| 6,308,072 B1 | * | 10/2001 | Labedz et al. ............. 455/448 |
| 6,715,558 B2 | | 4/2004 | Williamson |

* cited by examiner

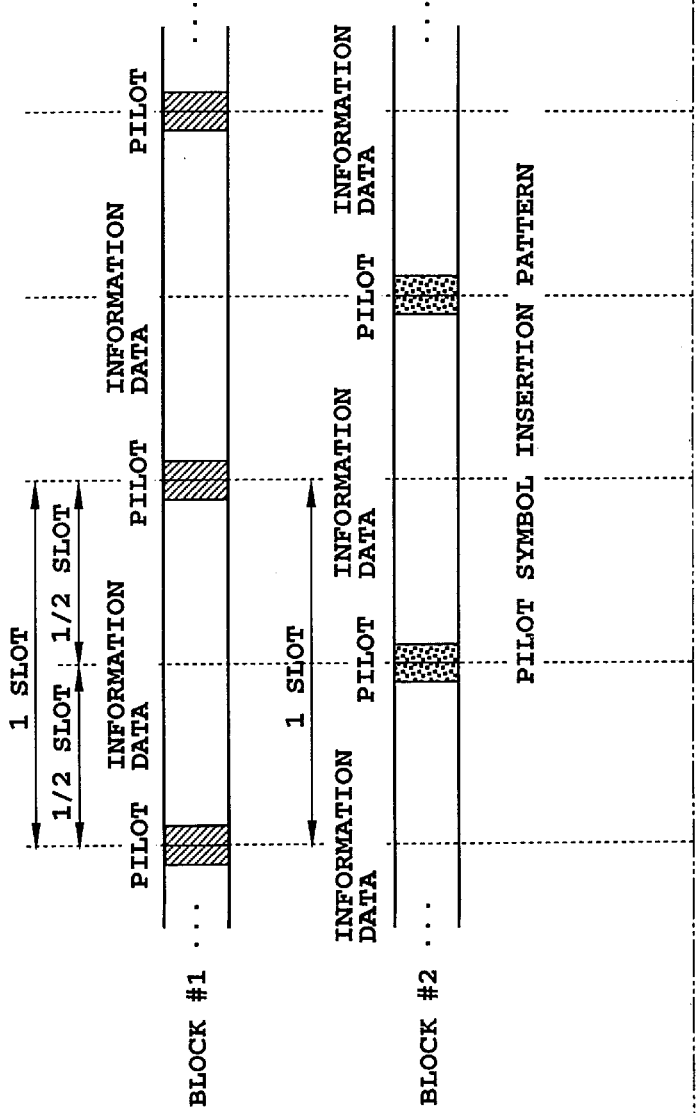

DS-CDMA TRANSMISSION METHOD

This is a divisional of U.S. patent application Ser. No. 08/865,591, filed May 29, 1997, now U.S. Pat. No. 6,097,711, issued Aug. 1, 2000.

BACKGROUND OF THE INVENTION

1. Field of the Invention

The present invention relates to a direct sequence code division multiple access (DS-CDMA) transmission method carrying out multiple access using spread spectrum in mobile communications, and particularly to a DS-CDMA transmission method that carries out code multiplexing of multiple code channels.

2. Description of Related Art

Recently, intensive research and development of the DS-CDMA system have been made as one of the next generation mobile communication systems. The DS-CDMA transmission system carries out communications between multiple users using the same frequency band, and individual users are identified by a spreading code properly assigned to each user.

The DS-CDMA system has advantages over the frequency division multiple access or time division multiple access in that it can increase the capacity in terms of the number of simultaneous subscribers within the same available frequency band, and is suitable for high speed signal transmission because it transmits information signals after spreading them into wideband signals.

In the mobile communication environment, straight paths between a base station and mobile stations are seldom unobstructed, thereby constituting multipath propagation. As a result, the received signal undergoes Rayleigh fading. In Rayleigh fading, the amplitude of a received signal has Rayleigh distribution, and its phase has a uniform distribution. It is necessary for a receiver to estimate the randomly varying phase of the received signal to carry out coherent detection which is more efficient than differential detection. One of the methods for estimating the received phase is implemented by inserting pilot symbols of a known pattern into information symbols at fixed intervals, and by estimating the received phase of each information symbol on the basis of the received phases estimated using the pilot symbols. In this case, the pilot symbols must be inserted at every time interval during which the phase fluctuation due to fading is nearly negligible.

There are mainly two methods for implementing high bit rate signal transmission in the DS-CDMA system: (1) a method which varies a spreading factor (processing gain) in accordance with the transmission information rate; and (2) a code multiplexing method which multiplexes multiple channels each having a fundamental information rate. Here, we will consider the second method.

FIG. 16 shows a conventional channel structure when carrying out the absolute coherent detection which makes the channel (amplitude and phase) estimation using the pilot symbols as mentioned above. In this figure, N denotes the number of code channels (the number of code multiplexing). Each code channel is spread using a short code (SC-1, ..., SC-N) with a period equal to that of information symbol, and is further spread using a spreading code referred to as a long code (LC-Y) with a period much longer than that of the common information symbol. The short codes serve to identify the individual code channels, and the long code serves to distinguish a user from the other simultaneous users in the same cell in reverse link channels, and from the other simultaneous users in the other cells in forward link channels. FIG. 17 shows a frame structure of a single code channel transmission.

The conventional system has the following problems:

(1) The pilot symbols, which are inserted into each code channel as shown in FIG. 16, are spread by the same spreading code assigned to each code channel for spreading data symbols. This results in some cross-correlation between the multiplexed code channels, which degrades the accuracy of the channel estimation by the pilot symbols. In other words, the conventional DS-CDMA code multiplexing method has a problem in that the accuracy of the channel estimation using the pilot symbols degrades owing to the cross-correlation between other code channels because the pilot symbols of respective code channels are spread using different spreading codes. The degradation is remarkable when the received signal power per path decreases under the multipath environment.

(2) The pilot symbols, which are inserted at the same positions in frames in the respective code channels as shown in FIG. 18A, are used to estimate the received phases for each code channel so as to obtain the transfer function of the channel on information data sequence by means of interpolation at the insertion intervals of the pilot symbols as shown in FIG. 18B. This results in a problem in that the accuracy of the channel estimation degrades with an increase in the fading fluctuation speed. In addition, since the transmission power control is also carried out at the insertion intervals of the pilot symbols by measuring the received signal power at the positions of the pilot symbols which are inserted in the same positions in the frames of respective code channels as shown in FIG. 19, there is another problem in that the accuracy of the transmission power control also degrades with an increase in the fading fluctuation speed.

SUMMARY OF THE INVENTION

It is therefore an object of the present invention to provide a DS-CDMA transmission method which can improve the accuracy of the channel estimation without much increasing the circuit scale of a transmitter and receiver in the DS-CDMA code multiplexing.

Another object of the present invention is to provide a DS-CDMA transmission method which can improve the tracking ability to fading of the channel estimation and the transmission power control using the pilot symbols without much increasing the circuit scale of the transmitter and receiver in the DS-CDMA code multiplexing.

According to a first aspect of the present invention, a DS-CDMA transmission method using a code multiplexing method which transmits a signal by generating a high bit rate transmission channel by code multiplexing a plurality of code channels, the DS-CDMA transmission method comprises the steps of:

assembling frames for respective code channels by inserting pilot symbols into information symbols at fixed intervals, the pilot symbols being used for channel estimation for coherent detection;

spreading the information symbols in each of the code channels using a spreading code properly assigned to the each of the code channels, the spreading code being selected from a group of orthogonal spreading codes that are orthogonal to each other and have a period equal to an information symbol period; and spreading the pilot symbols in the code channels using one of the spreading codes being selected from the group of the orthogonal spreading codes, or any of the spreading codes other than the spreading codes assigned to the information symbols in the code channels from the group of the orthogonal spreading codes.

According to a second aspect of the present invention, a DS-CDMA transmission method using a code multiplexing method which transmits a signal by generating a high bit rate transmission channel by code multiplexing a plurality of code channels, the DS-CDMA transmission method comprises the steps of:

assembling frames for one of the code channels by inserting pilot symbols into information symbols at fixed intervals, the pilot symbols being used for channel estimation for coherent detection;

spreading the information symbols in each of the code channels using a spreading code properly assigned to the each of the code channels, the spreading code being selected from a group of orthogonal spreading codes that are orthogonal to each other and have a period equal to an information symbol period; and spreading the pilot symbols, which are generated only in the one of the code channels, using one of the spreading codes being selected from the group of the orthogonal spreading codes, or any of the spreading codes other than the spreading codes assigned to the information symbols in the code channels from the group of the orthogonal spreading codes.

According to a third aspect of the present invention, a DS-CDMA transmission method using a code multiplexing method which transmits a signal by generating a high bit rate transmission channel by code multiplexing a plurality of code channels, the DS-CDMA transmission method comprises the steps of:

convolutionally encoding transmitted data collectively;

writing a convolutionally encoded information data sequence collectively at every $N \times X_2$ interval, where N is a number of code channels;

reading, after having written entire information data in Z frames in a direction, where Z is a natural number, the information data in a direction perpendicular to the direction in which the entire information data in Z frames are written at every $Y_2$ interval, where $X_2$ and $Y_2$ are natural numbers that satisfy the relations $N \times X_2 \cong Y_2$, and $N \times X_2 \times Y_2$=the total number of information data in the Z frames; and carrying out interleaving that distributes the read information data to N code channels after interleaving.

According to a fourth aspect of the present invention, a DS-CDMA transmission method using a code multiplexing method which transmits a signal by generating a high bit rate transmission channel by code multiplexing a plurality of code channels, the DS-CDMA transmission method comprises, when assembling frames for respective code channels by inserting into information symbols pilot symbols used for channel estimation for coherent detection at fixed intervals, the steps of:

dividing N code channels to K blocks each consisting of H code channels, where N is a number of multiplexed code channels, K is a number of blocks, H is a number of code channels in the block, and $N=H \times K$;

inserting pilot symbols into same positions of frames in the H code channels in a same block; and shifting positions of inserting the pilot symbols from block to block such that intervals between closest pilot symbols become uniform with regard to entire pilot symbols in the K blocks.

Here, the DS-CDMA transmission method may further comprise, when carrying out the channel estimation for the coherent detection using the pilot symbols, the steps of:

obtaining channel estimates at the positions of the pilot symbols in the code channels using the pilot symbols inserted into the information symbols according to a pilot symbol insertion pattern in the block to which the code channel belongs;

obtaining channel estimates at the positions of the pilot symbols in each of the blocks by averaging the channel estimates of H code channels in that block; and obtaining transfer functions of the code channels on an information data sequence at pilot symbol insertion intervals of the entire pilot symbols inserted to the entire code channels, the transfer functions being obtained by interpolation using, in common to the entire code channels, the channel estimates at the positions of the pilot symbols in the blocks.

Here, the DS-CDMA transmission method may further comprise, when measuring received signal power for carrying out transmission power control, the steps of:

measuring the received signal power of the code channels using the pilot symbols inserted into the information symbols according to a pilot symbol insertion pattern in the block to which the code channel belongs;

obtaining measured values of the received signal power at the positions of the pilot symbols in each of the blocks by averaging the measured received signal power of the H code channels in that block; and carrying out the transmission power control at pilot symbol insertion intervals of the entire pilot symbols distributed to the entire code channels using, in common to the entire code channels, the measured values of the received signal power at the positions of the pilot symbols in the blocks.

The above and other objects, effects, features and advantages of the present invention will become more apparent from the following description of the embodiments thereof taken in conjunction with the accompanying drawings.

BRIEF DESCRIPTION OF THE DRAWINGS

FIG. 12 illustrates the relationship between FIGS. 12A and 12B.

FIG. 12A is a diagram illustrating a pilot symbol insertion pattern (when a block number K=2) in the DS-CDMA transmission system in accordance with the present invention;

FIG. 15 illustrates the relationship between FIGS. 15A and 15B.

DETAILED DESCRIPTION OF PREFERRED EMBODIMENTS

The invention will now be described with reference to the accompanying drawings.

Embodiment 1

Figure 1:
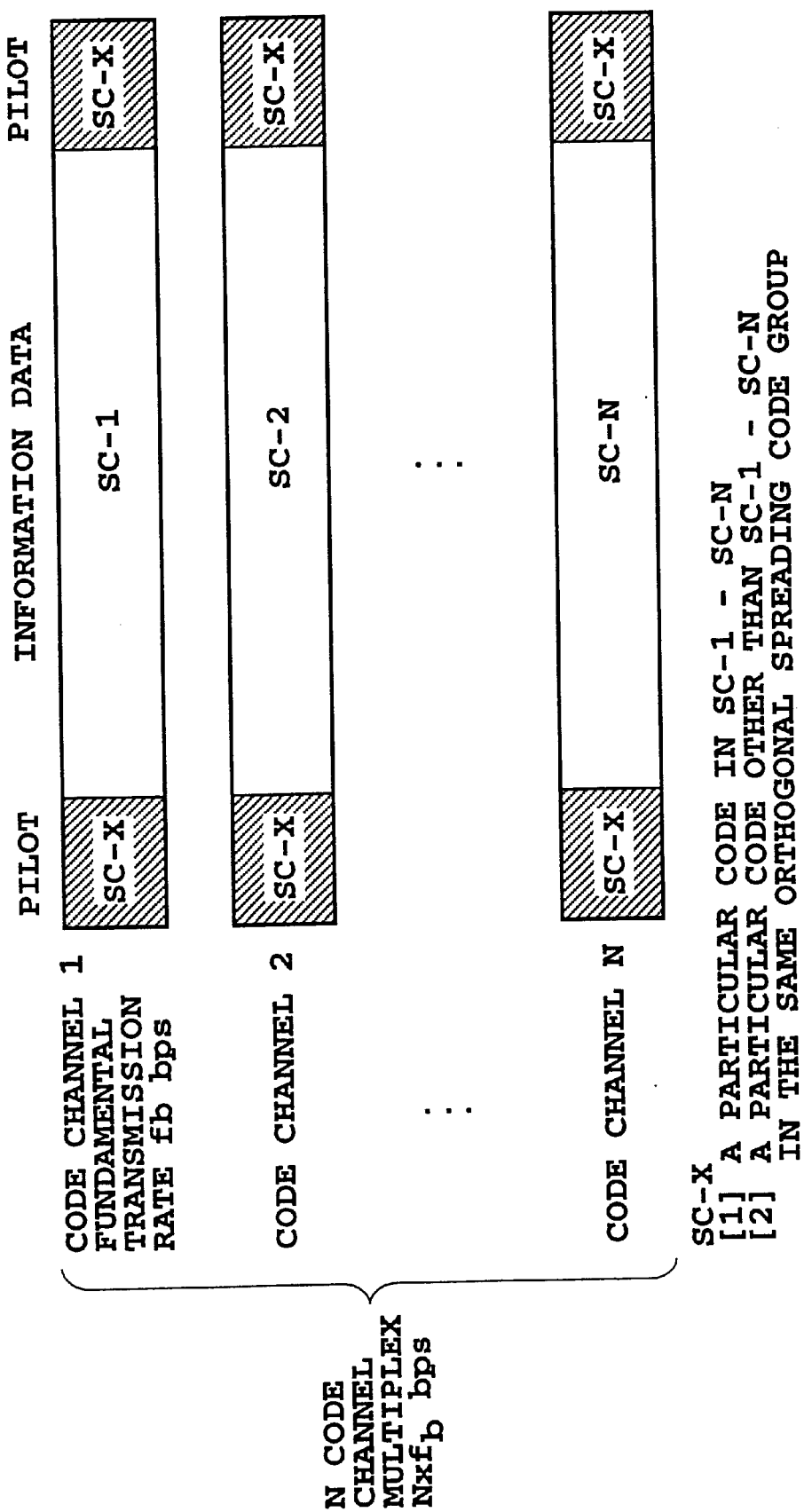
FIG. 1 is a diagram illustrating an example of a channel structure in the DS-CDMA transmission system in accordance with the present invention.
Figure 2:
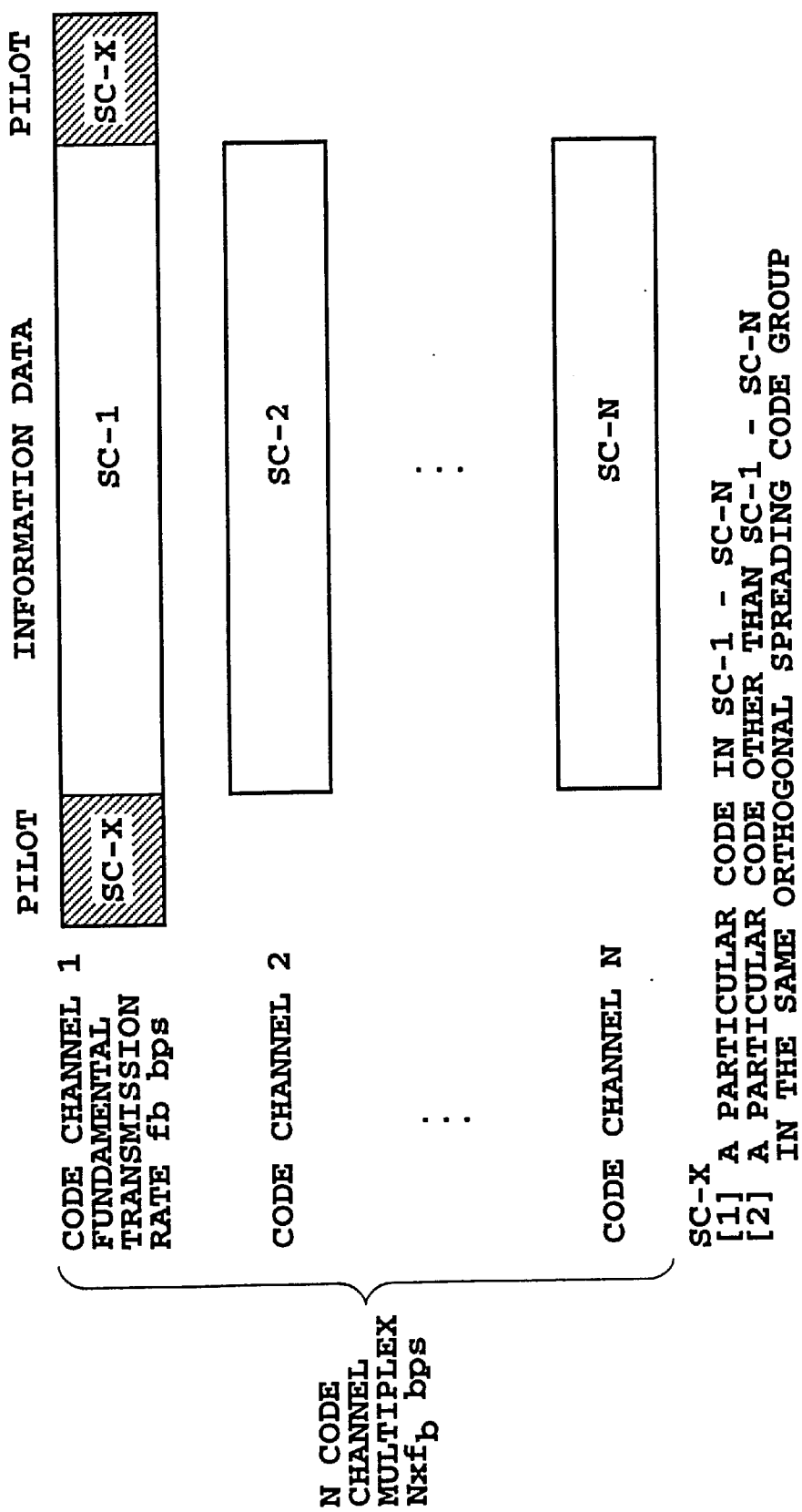
FIG. 2 is a diagram illustrating another example of a channel structure in the DS-CDMA transmission system in accordance with the present invention.

FIG. 1 shows an example of a channel structure of a DS-CDMA transmission system in accordance with the present invention. As shown in FIG. 1, each frame of a code channel with a fundamental transmission rate fb consists of pilot symbols and information data whose information rate is expanded by spreading factor (processing gain) into a wideband signal. The N code multiplexing of such fundamental channels enables the information to be transmitted at the transmission rate of N×fb bps, if all the channels have the same quality as the fundamental channel. In this case, if a common spreading code is used to spread the pilot symbols of the N code channels, the cross-correlation between the individual code channels can be eliminated. Since the code channels undergo the same fading in the multicode multiplex transmission, the same pilot symbols can be used in common. FIG. 2 illustrates a channel structure different from that of FIG. 1, in which only one code channel transmits the pilot symbols.

Figure 3:
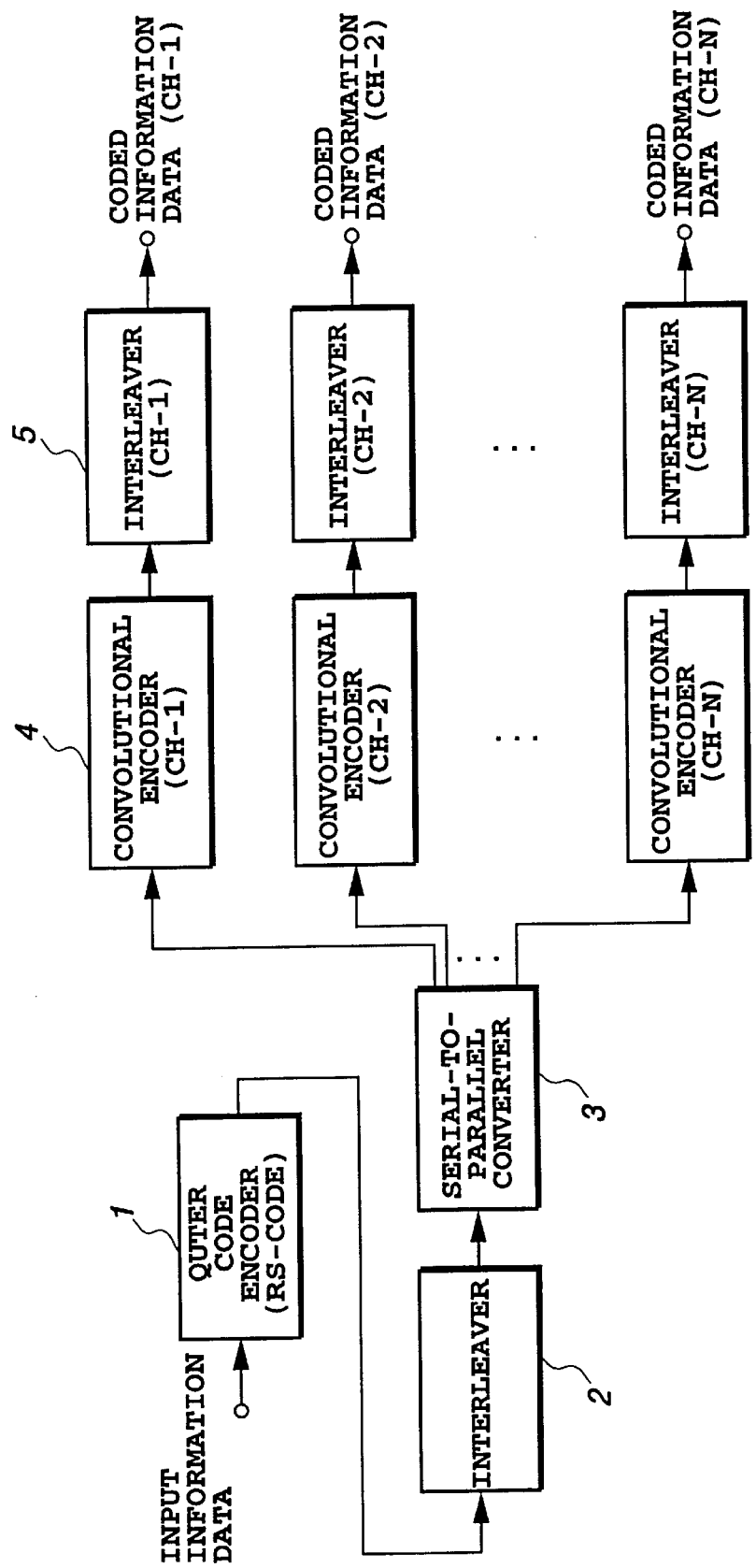
FIG. 3 is a block diagram showing a configuration of an embodiment of an error correcting encoder in the DS-CDMA transmission system in accordance with the present invention.
Figure 9:
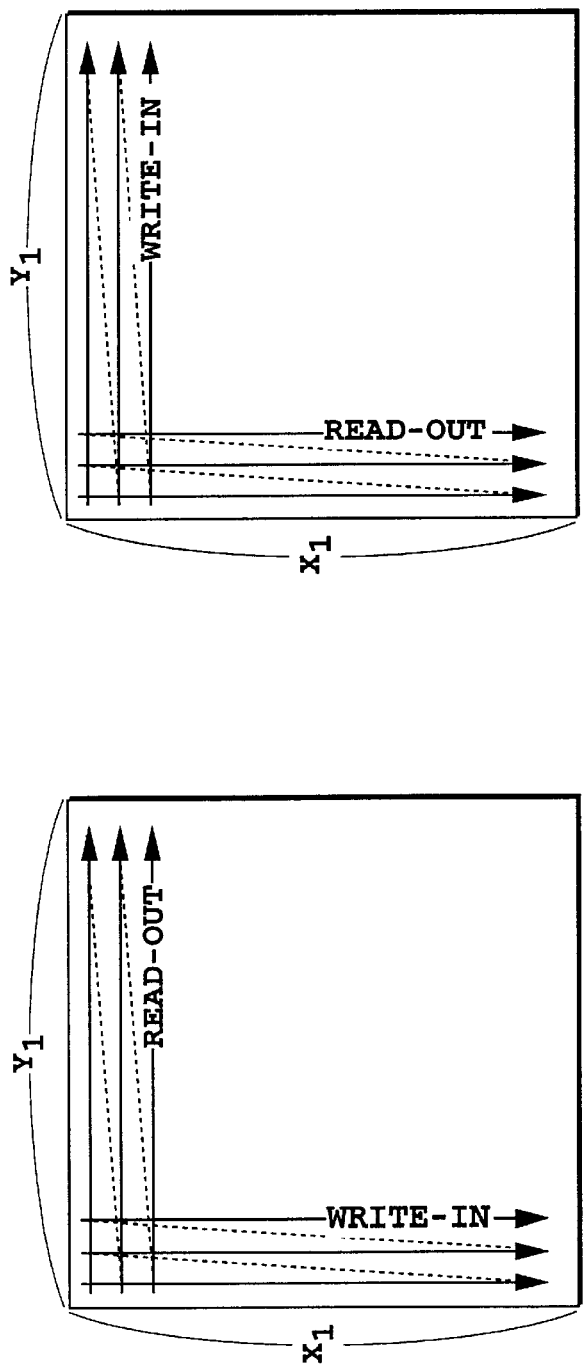
FIG. 9A is a diagram illustrating the operation of an interleaver in the DS-CDMA transmission system in accordance with the present invention.
FIG. 9B is a diagram illustrating the operation of a deinterleaver in the DS-CDMA transmission system in accordance with the present invention.

FIG. 3 is a block diagram showing an error correcting encoder in the multicode multiplex transmission. Input information data is coded by an outer code encoder 1 using an outer code of a concatenated error correcting code, undergoes interleaving by an interleaver 2, and is distributed to N code channels through a serial-to-parallel converter 3. Subsequently, convolutional coding by a convolutional encoder 4 and interleaving by an interleaver 5 are carried out successively for each code channel. FIG. 9A illustrates an interleaving method of the DS-CDMA transmission system. The entire information data in Z-frames are written in the $X_1$ data direction for each code channel, and are read in the $Y_1$ data direction perpendicular to the write direction. Here, $X_1$ and $Y_1$ are natural numbers satisfying the relations $N \times X_1 \times Y_1$=the total number of information data in the Z frames, and $X_1 \cong Y_1$.

Figure 4:
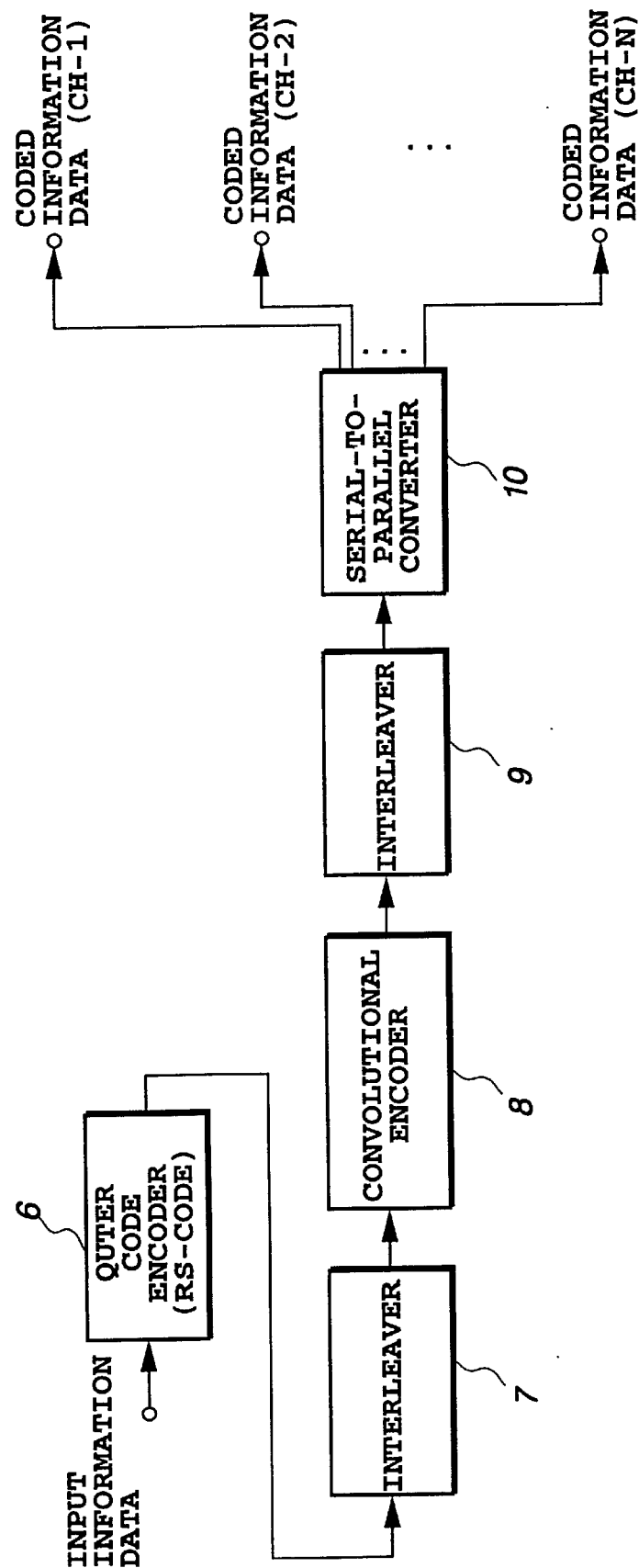
FIG. 4 is a block diagram showing another configuration of an embodiment of an error correcting encoder in the DS-CDMA transmission system in accordance with the present invention.
Figure 10:
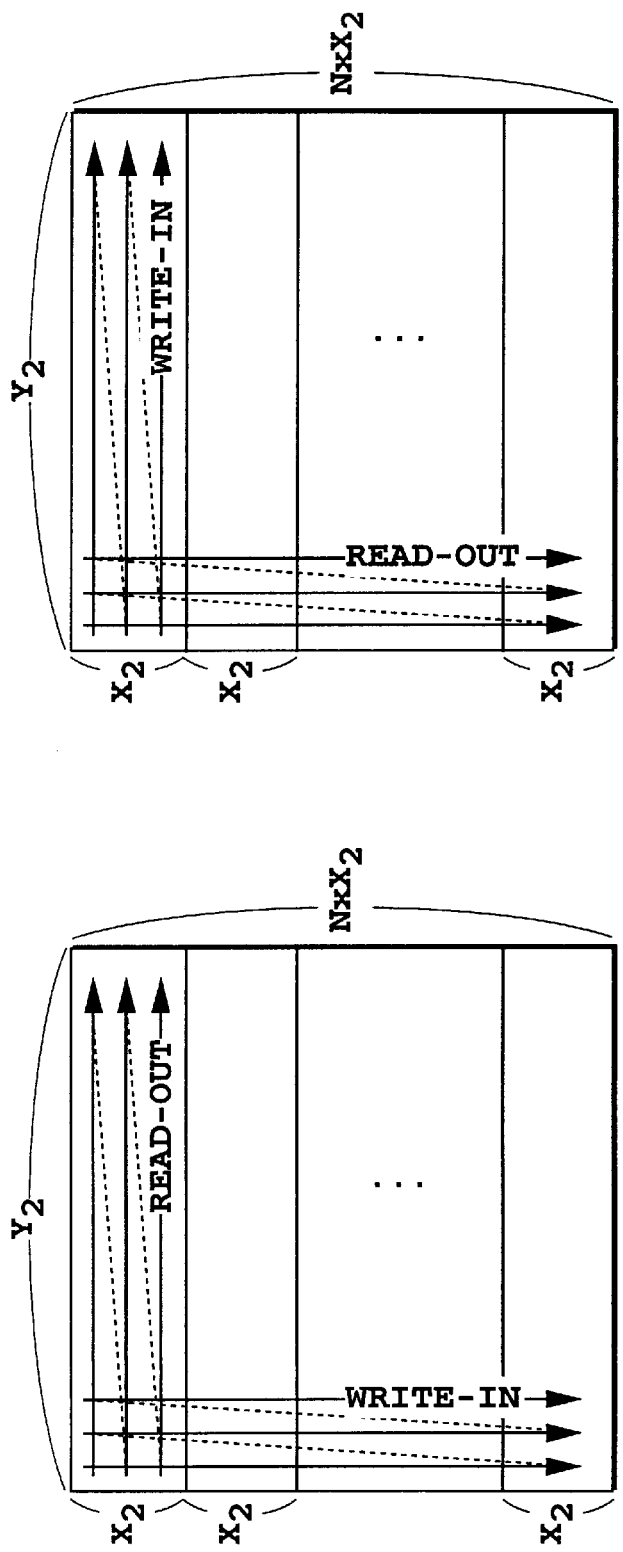
FIG. 10A is a diagram illustrating the operation of an interleaver in the DS-CDMA transmission system in accordance with the present invention.
FIG. 10B is a diagram illustrating the operation of a deinterleaver in the DS-CDMA transmission system in accordance with the present invention.

FIG. 4 shows a configuration of an error correcting encoder of the transmitter of the DS-CDMA transmission system. As in FIG. 3, the input information data is encoded by an outer code encoder 6 using an outer code of a concatenated error correcting code, and undergoes interleaving by an interleaver 7 to be output. The output data collectively undergo a convolutional coding by a convolutional encoder 8, and the convolutionally encoded information sequence is collectively interleaved by an interleaver 9. FIG. 10A illustrates an interleaving method of the present DS-CDMA transmission system. The convolutionally encoded information data sequence is written at every $N \times X_2$ period, and after thus writing the entire information data in the Z frames, the data are read at every $Y_2$ information data period in the direction perpendicular to the write direction. Here, $X_2$ and $Y_2$ are natural numbers satisfying the relations $N \times X_2 \times Y_2$=the total number of the information data in the Z frames, and $N \times X_2 \cong Y_2$.

After that, the interleaved information data are distributed into N code channels by a serial-to-parallel converter 10.

Figure 5:
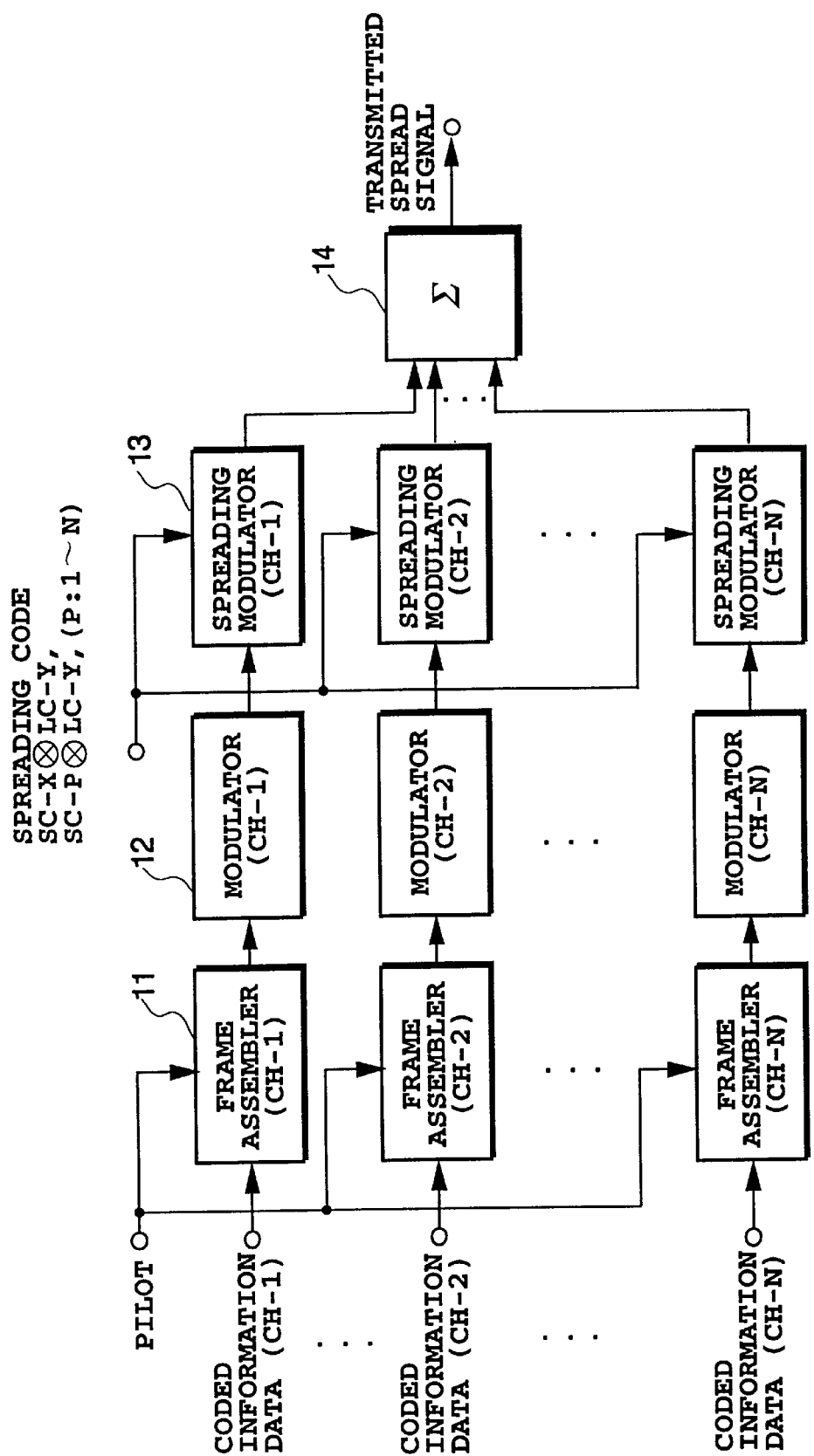
FIG. 5 is a block diagram showing a configuration of an embodiment of a transmitter in the DS-CDMA transmission system in accordance with the present invention.

FIG. 5 is a block diagram showing the transmitter of the DS-CDMA transmission system. Each frame assembler 11 inserts pilot symbols, which are used for channel estimation for the coherent detection, into the coded information data of each code channel shown in FIGS. 3 and 4 at fixed intervals (the pilot symbols may be inserted into only one code channel if it is desired to do so). Subsequently, the data are modulated by each modulator 12. The modulated data symbols of each code channel output from each modulator 12 are spread using a spreading code (SC-X(X)LC-Y) for the pilot symbols, and using spreading codes (SC-P(X)LC-Y, where P represents 1-N) for the information symbols of respective code channels. The spread signals of respective code channels are summed up by an adder 14 to be transmitted.

Figure 6:
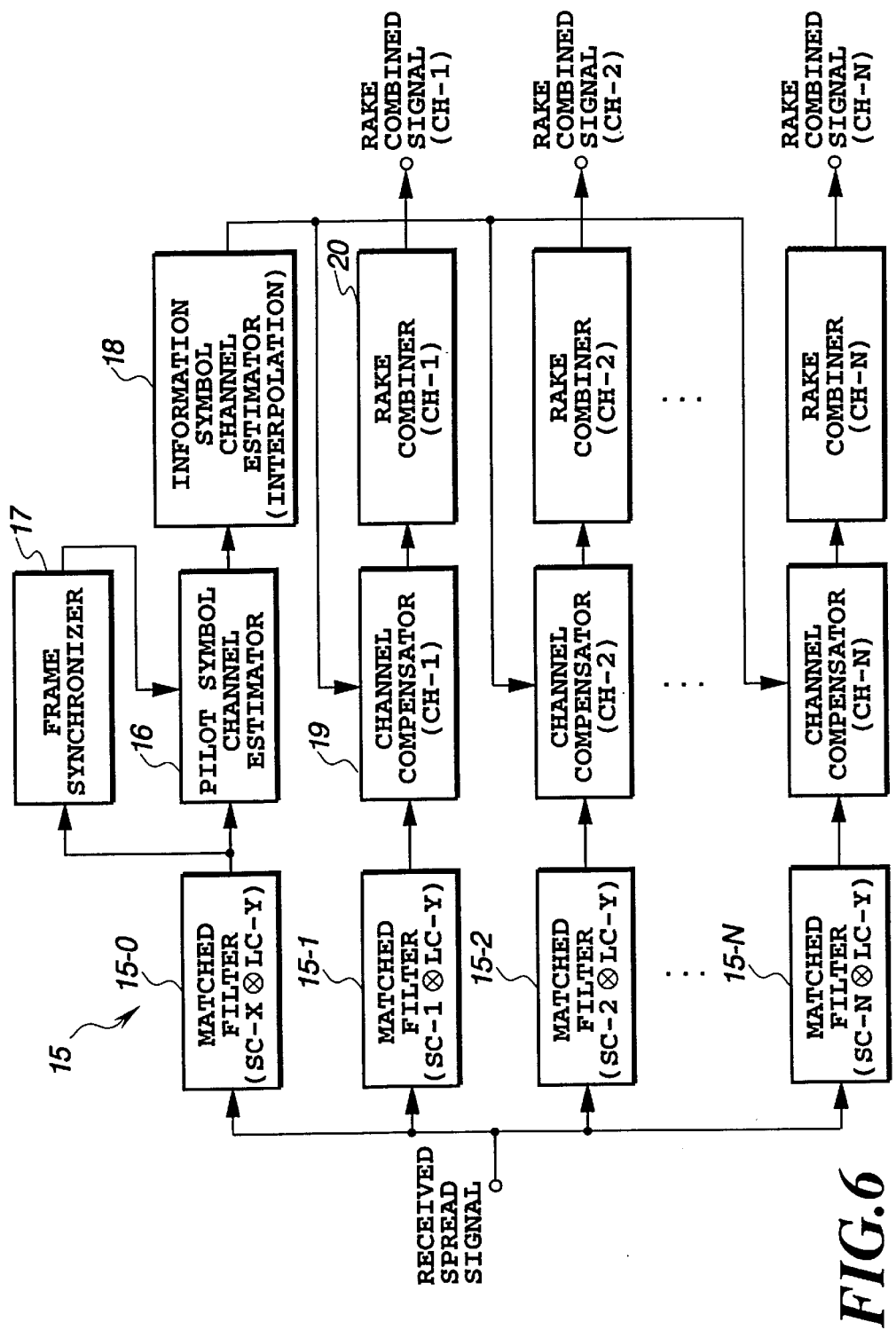
FIG. 6 is a block diagram showing a configuration of an embodiment of a receiver in the DS-CDMA transmission system in accordance with the present invention.

FIG. 6 is a block diagram showing a receiver of the DS-CDMA transmission system. The received spread signal is input in common to matched filters 15-0, . . . , 15-N corresponding to the spreading codes. The pilot symbols in the received signal are despread by the matched filter 15-0 using the spreading code (SC-X(X)LC-Y) as the spreading code replica. Then, the received phase of the pilot symbols is estimated by a pilot symbol channel estimator 16 which averages several pilot symbols using the output from a frame synchronizer 17. An information symbol channel estimator 18 estimates the received phase at each position of the information symbols by interpolating the estimated information fed from the pilot symbol channel estimator 16. Since the code channels in the received signal undergo the same fluctuations due to fading, the estimated phase fluctuations in the information symbols can be used in common to the entire code channels. On the other hand, the information symbols on individual code channels are despread by the matched filters 15-1-15-N using different spreading codes (SC-P(X)LC-Y, where P denotes 1-N) as spreading code replicas for respective channels. Using the signal fed from the information symbol channel estimator 18, each channel compensator 19 compensates the despread information symbols on the code channels for the received phase fluctuations which are estimated using the pilot symbols. In a multipath configuration, the phase estimator and compensator (17, 18 and 19), which use pilot channels corresponding to N code channels as shown in FIG. 6, are used for each multipath to be combined. The information symbols from respective paths which have been compensated for the fading phase fluctuations by the channel compensator 19 of each channel are RAKE combined by a RAKE combiner 20 which sums up the multipath components using estimated received complex envelopes of individual paths as weights.

Figure 7:
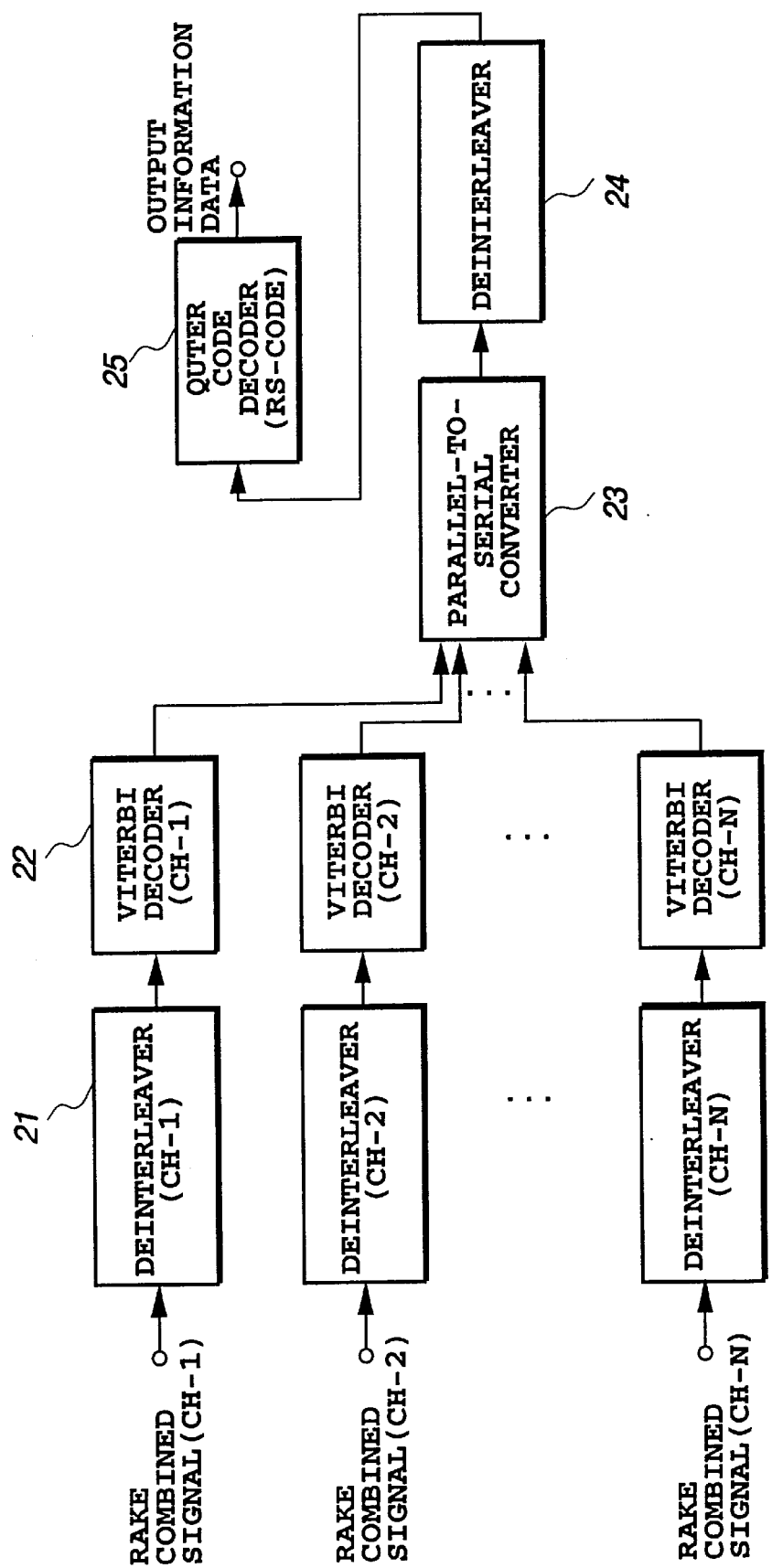
FIG. 7 is a block diagram showing a configuration of an embodiment of an error correcting decoder in the DS-CDMA transmission system in accordance with the present invention.
Figure 8:
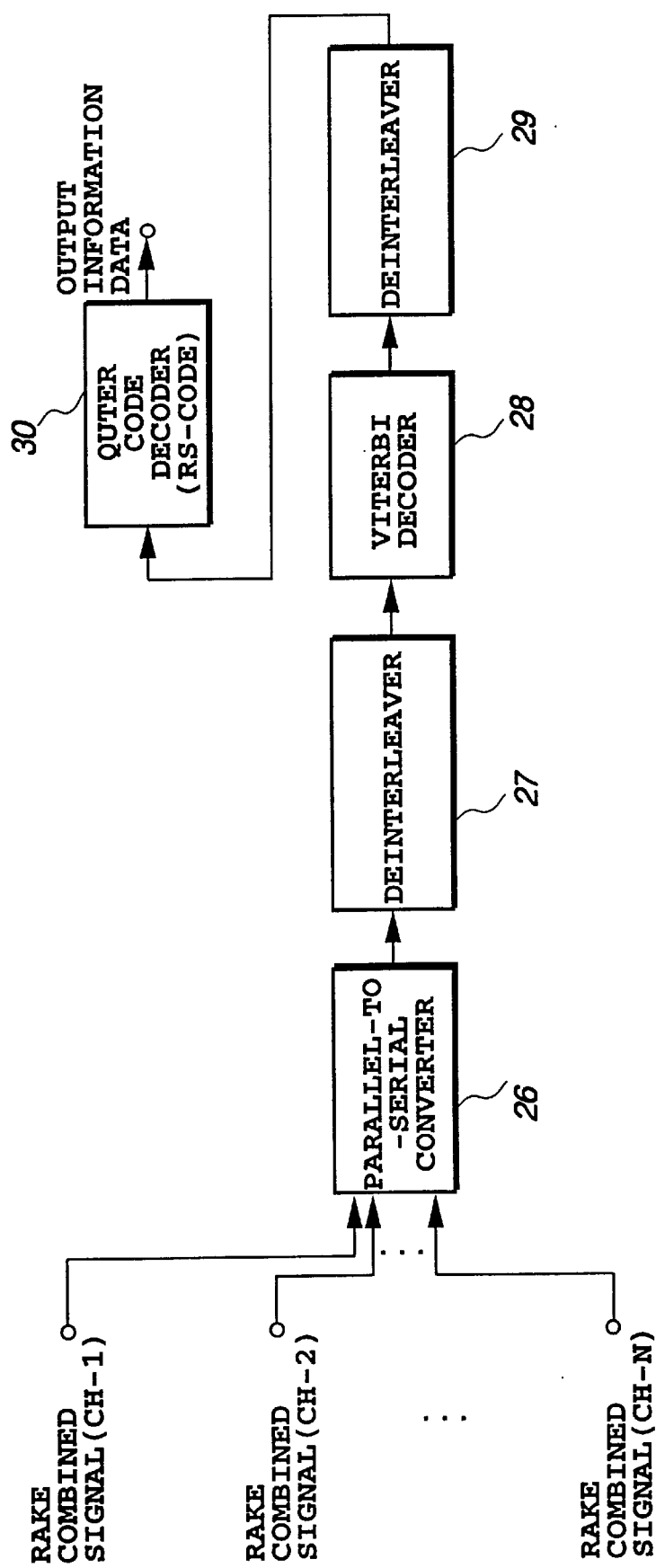
FIG. 8 is a block diagram showing another configuration of an embodiment of an error correcting decoder in the DS-CDMA transmission system in accordance with the present invention.

The RAKE combined signals are each input to an error correcting decoder as shown in FIGS. 7 and 8.

FIG. 7 shows a configuration of the error correcting decoder of the DS-CDMA transmission system. The RAKE combined signals are each deinterleaved by a deinterleaver 21 separately for each code channel. FIG. 9B illustrates a deinterleaving method of the DS-CDMA transmission system, in which write and read are carried out in the directions opposite to those in the interleaving method as shown in FIG. 9A. The deinterleaved signals are each decoded by a Viterbi decoder 22 separately for each channel. The decoded data of the respective code channels undergo parallel-to-serial conversion by a parallel-to-serial converter 23, followed by the deinterleave by a deinterleaver 24 and the decoding by an outer code decoder 25, to be output.

FIG. 8 shows another configuration of the error correcting decoder of the DS-CDMA transmission system. The RAKE combined signals of the N code channels undergo parallel-to-serial conversion by a parallel-to-serial converter 26, and then are collectively deinterleaved by a deinterleaver 27. FIG. 10B illustrates a deinterleaving method of the DS-CDMA transmission system, in which write and read are carried out in the directions opposite to those in the inter-leaving method as shown in FIG. 10A. The deinterleaved signals are collectively decoded by a Viterbi decoder 28, followed by the deinterleave by a deinterleaver 29 and decoding by an outer code decoder 30, to be output.

Embodiment 2

Figure 11:
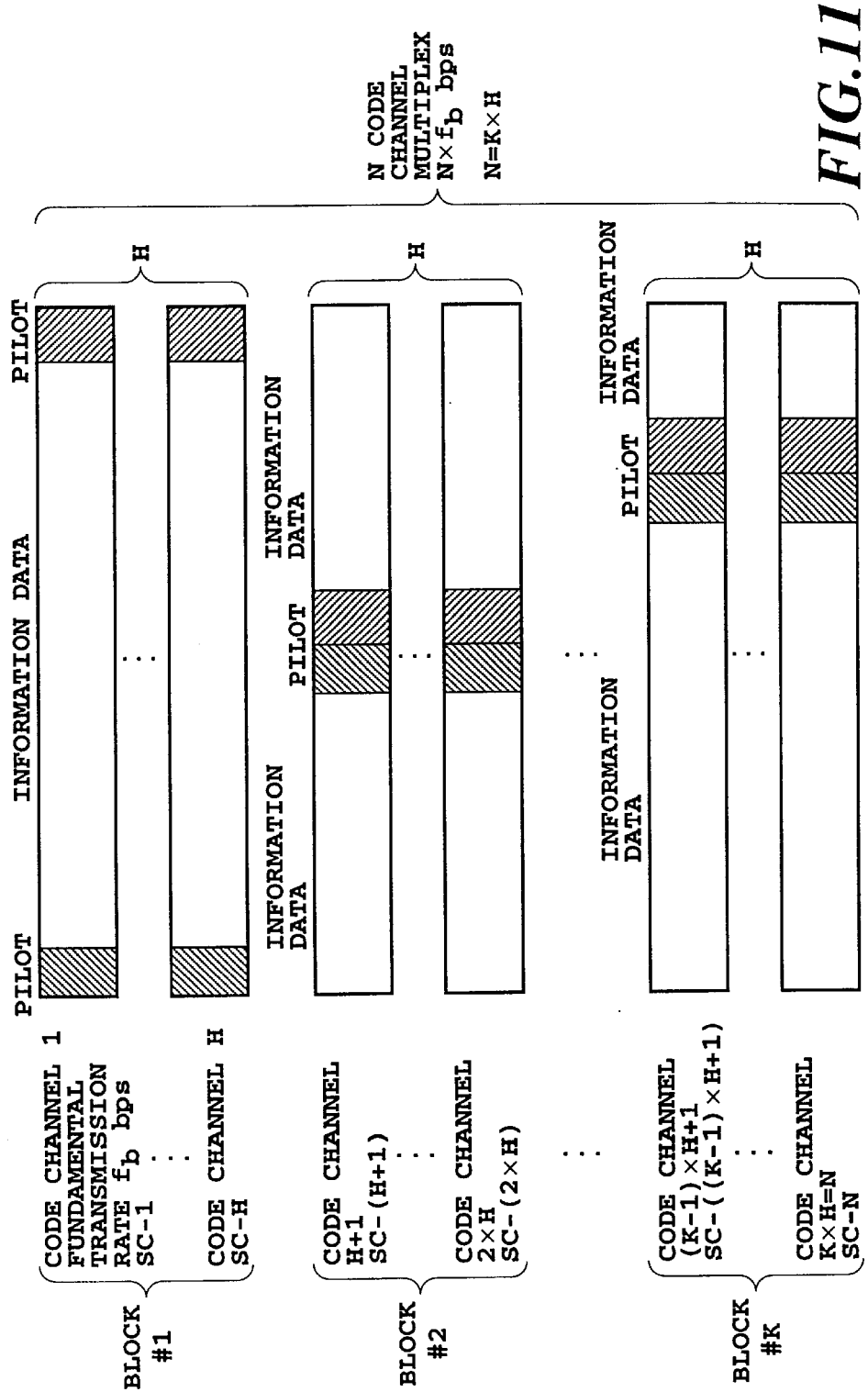
FIG. 11 is a diagram illustrating another example of a channel structure in the DS-CDMA transmission system in accordance with the present invention.

FIG. 11 shows another example of a channel structure of a DS-CDMA transmission system in accordance with the present invention. As shown in FIG. 11, each frame of a code channel with a fundamental transmission rate fb consists of pilot symbols and information data whose information rate is expanded by the spreading factor (processing gain), thereby generating a wideband signal. The N code multiplexing of such fundamental channels enables the information to be transmitted at the transmission rate of N×fb bps, if all the channels have the same quality as the fundamental channel. Here, the N code channels are divided into K blocks each consisting of H code channels, where N is the number of multiplexed code channels, K is the number of blocks, H is the number of code channels in each block, and N=H×K. The integer K may be even or odd. The H code channels in the same block have the pilot symbols inserted at the same positions in the frames. With regard to the entire pilot symbols in the different K blocks of the code channels, the inserted positions of the pilot symbols in the K blocks are shifted such that the intervals become uniform between the closest pilot symbols.

In the present embodiment, the input information data also undergo the error correcting encoding by the error correcting encoder as shown in FIG. 3. In addition, the data are interleaved by the same method as shown in FIG. 9A.

Figure 14:
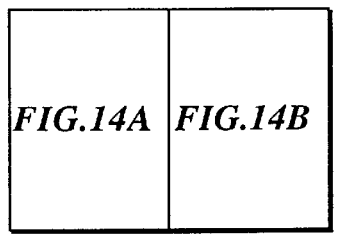
FIG. 14 illustrates the relationship between FIGS. 14A and 14B.
Figure 14A:
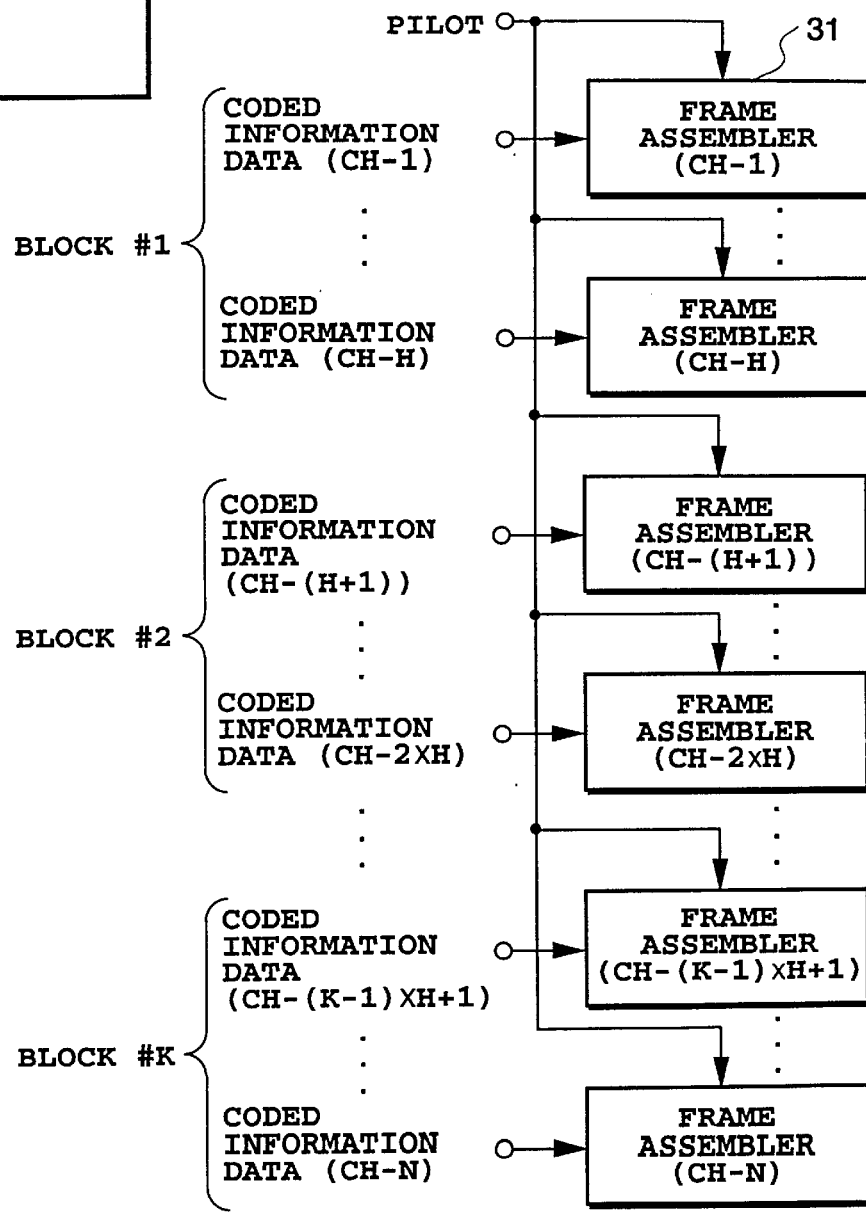
FIG. 14A is a block diagram showing another configuration of the embodiment of the transmitter in the DS-CDMA transmission system in accordance with the present invention.
Figure 14B:
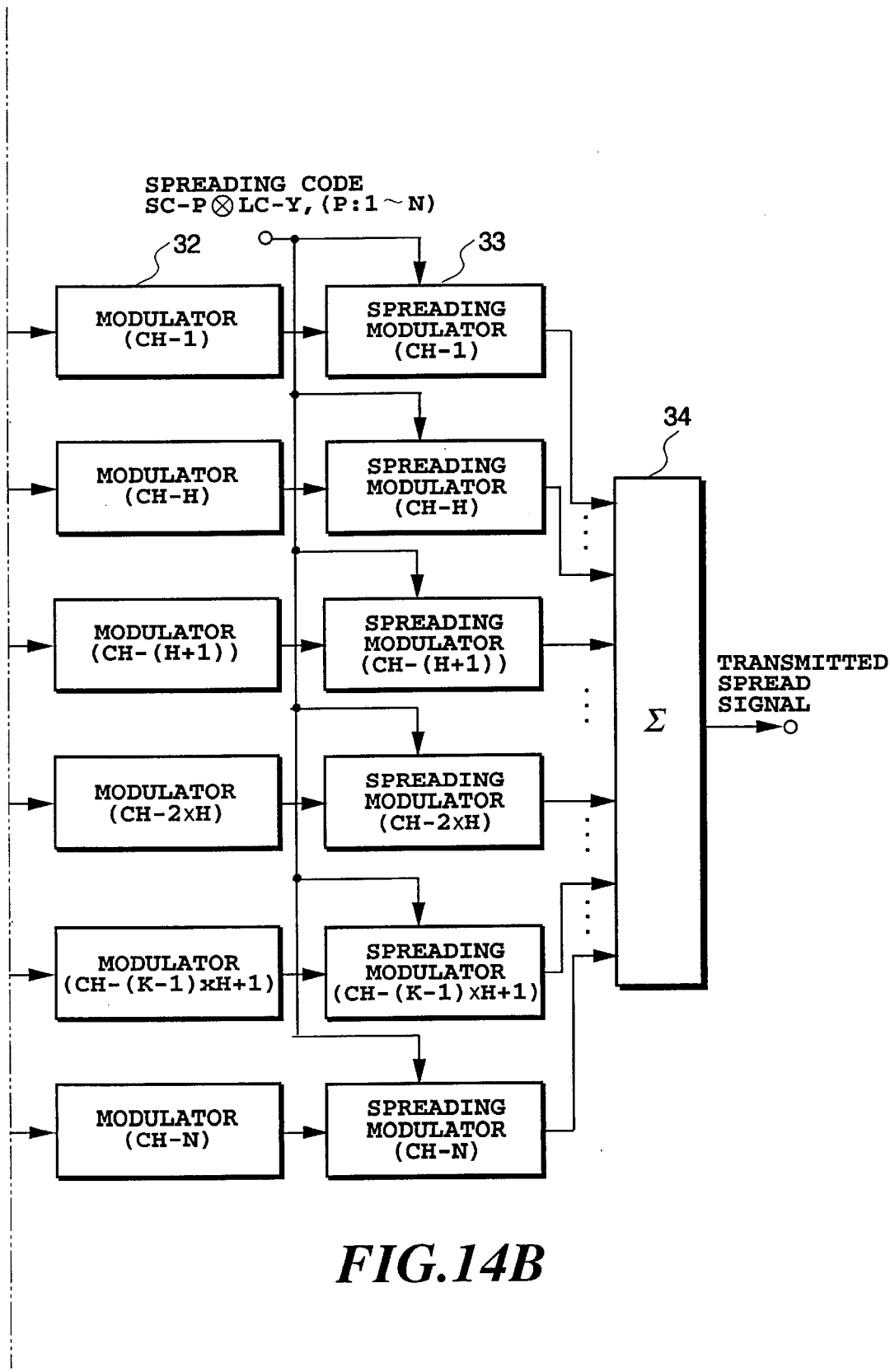
FIG. 14B is a block diagram showing another configuration of the embodiment of the transmitter in the DS-CDMA transmission system in accordance with the present invention.
Figure 20:
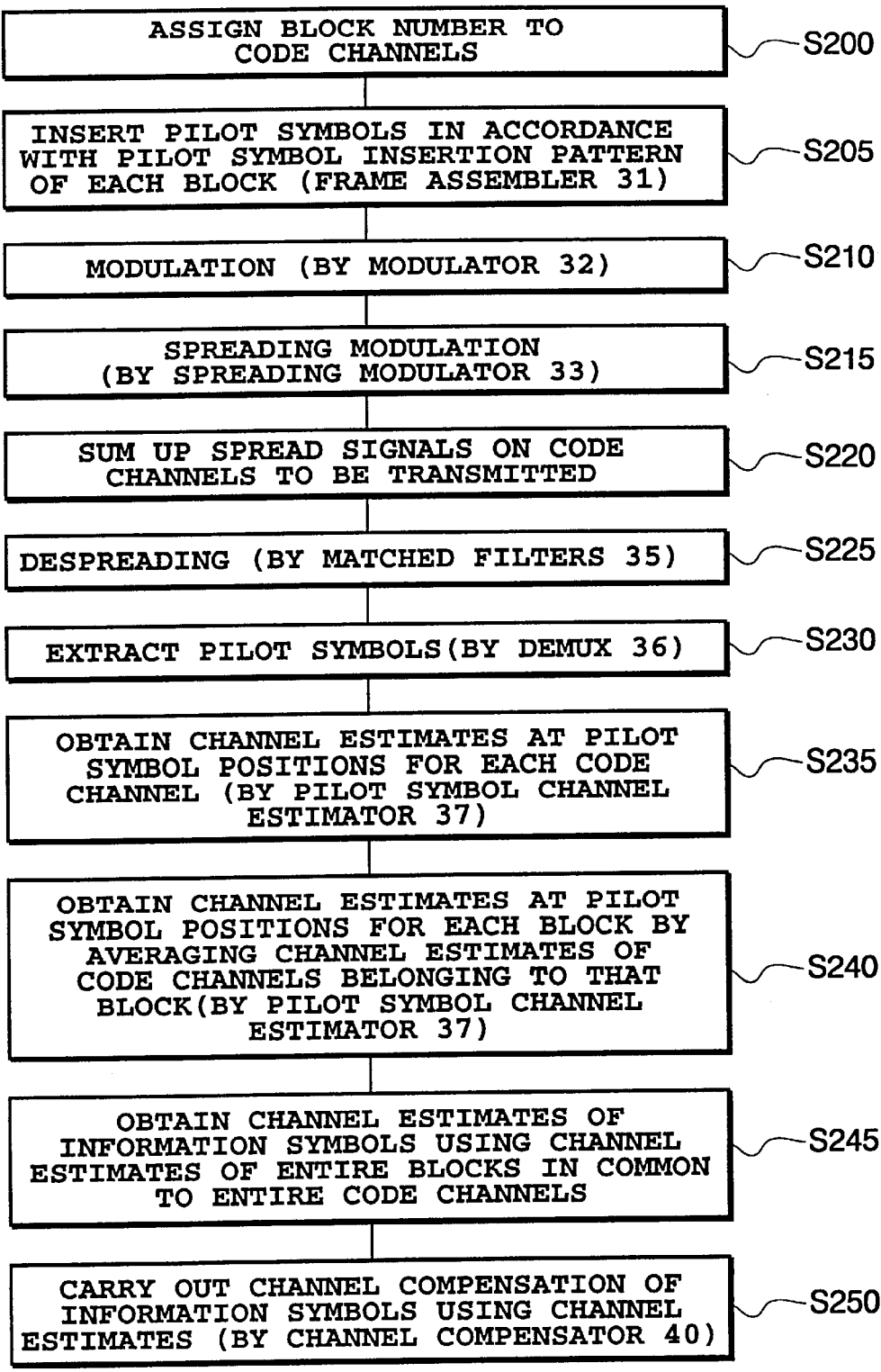
FIG. 20 is a flowchart showing a transmission and reception method in accordance with the present invention.

FIG. 14A and FIG. 14B are block diagrams showing the transmitter of the DS-CDMA transmission system, and FIG. 20 is a flowchart of the transmission and reception (S200–S250). Each frame assembler 31 inserts pilot symbols, which are used for channel estimation for the coherent detection, into the coded information data of each code channel fed from the circuit as shown in FIG. 3, at fixed intervals in accordance with a pilot symbol insertion pattern of the block to which the code channel belongs (S200–S210). The modulated data symbols of the code channels output from respective modulators 32 are separately spread by spreading modulators 33 using spreading codes (SC-P(X)LC-Y, where P represents 1-N) assigned to respective code channels (S215). The spread signals of the respective code channels are summed up by an adder 34 to be transmitted (S220).

Figure 12B:
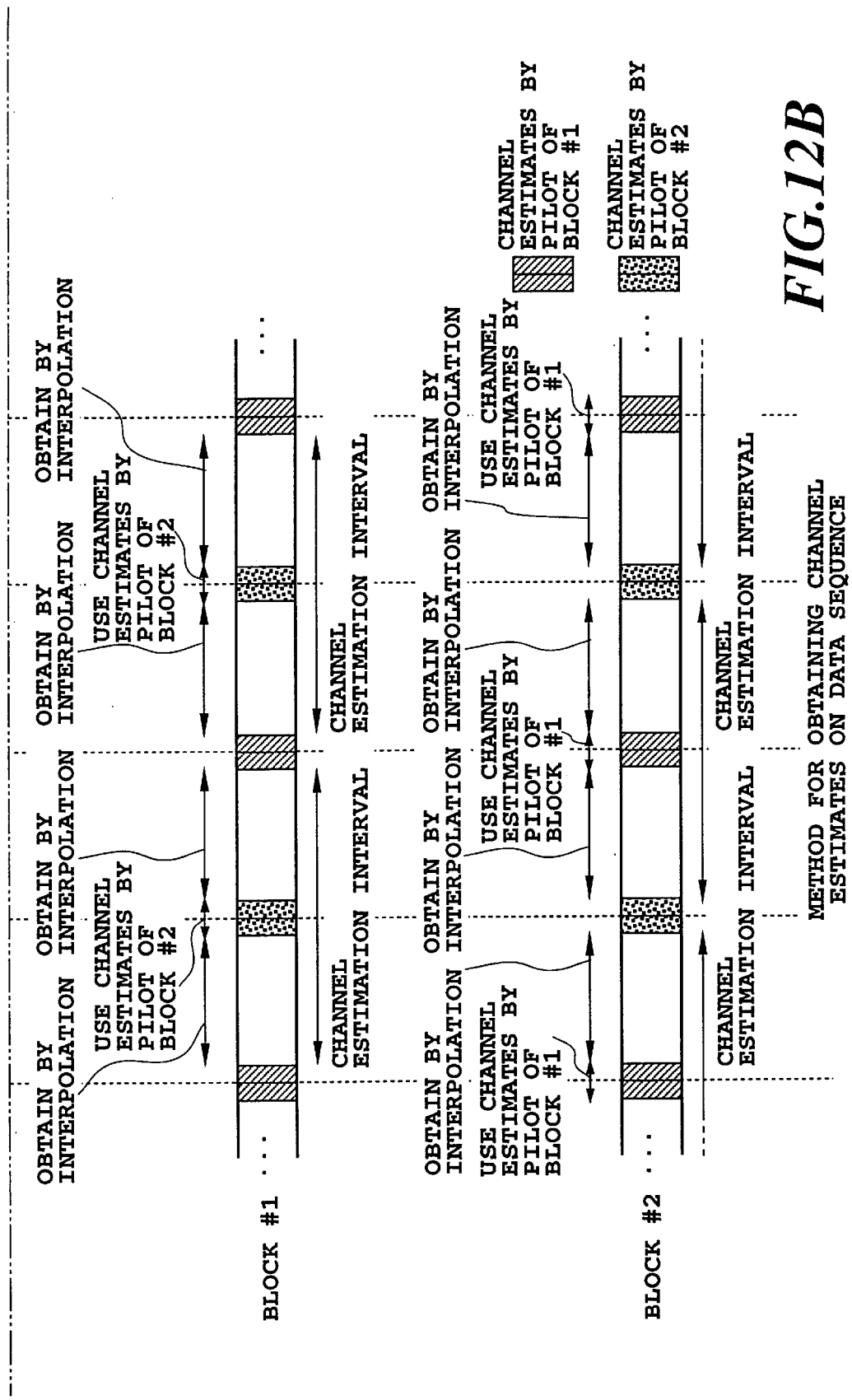
FIG. 12B is a diagram illustrating a channel estimation method (when a block number K=2) in the DS-CDMA transmission system in accordance with the present invention.
Figure 15A:
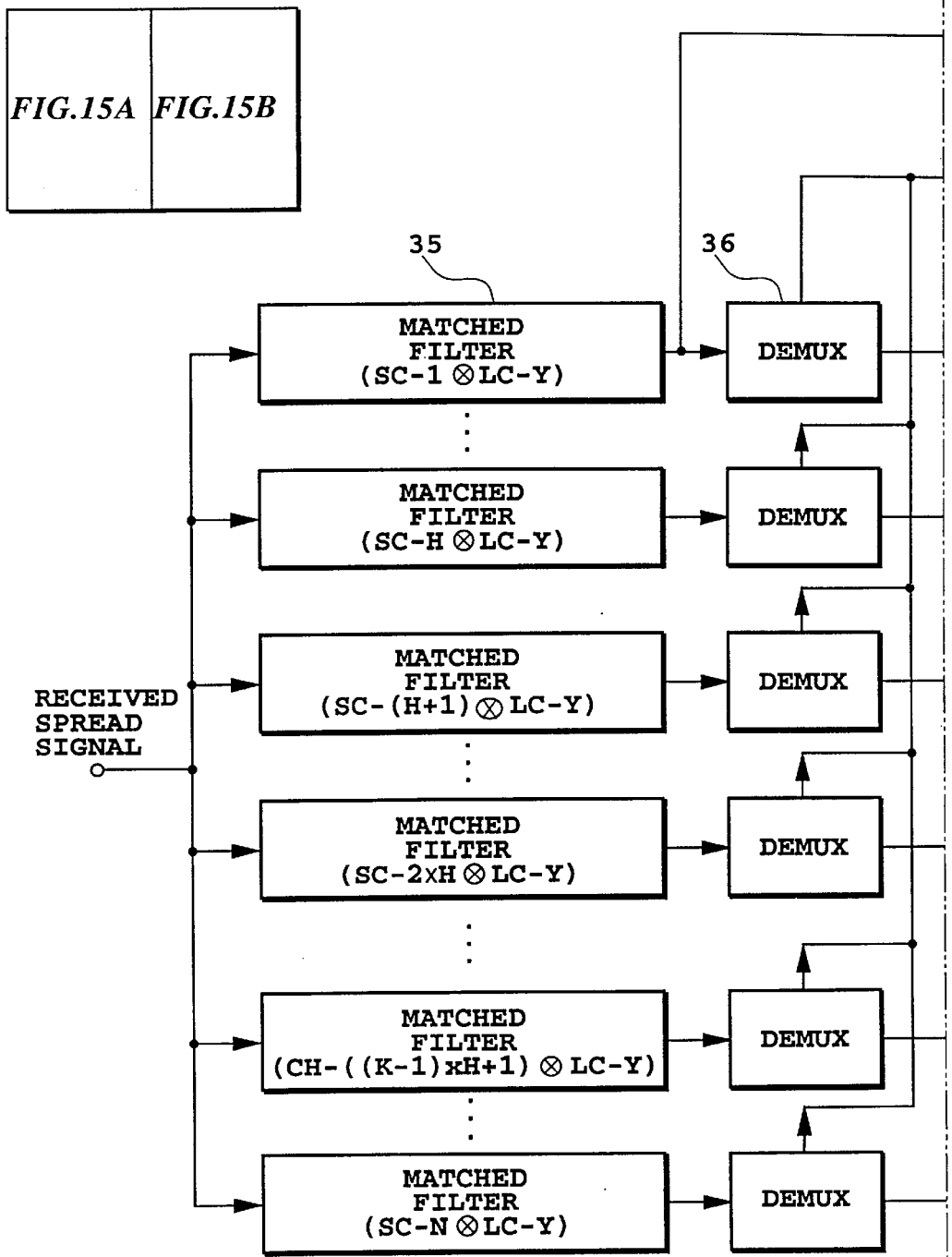
FIG. 15A is a block diagram showing another configuration of the embodiment of the receiver in the DS-CDMA transmission system in accordance with the present invention.
Figure 15B:
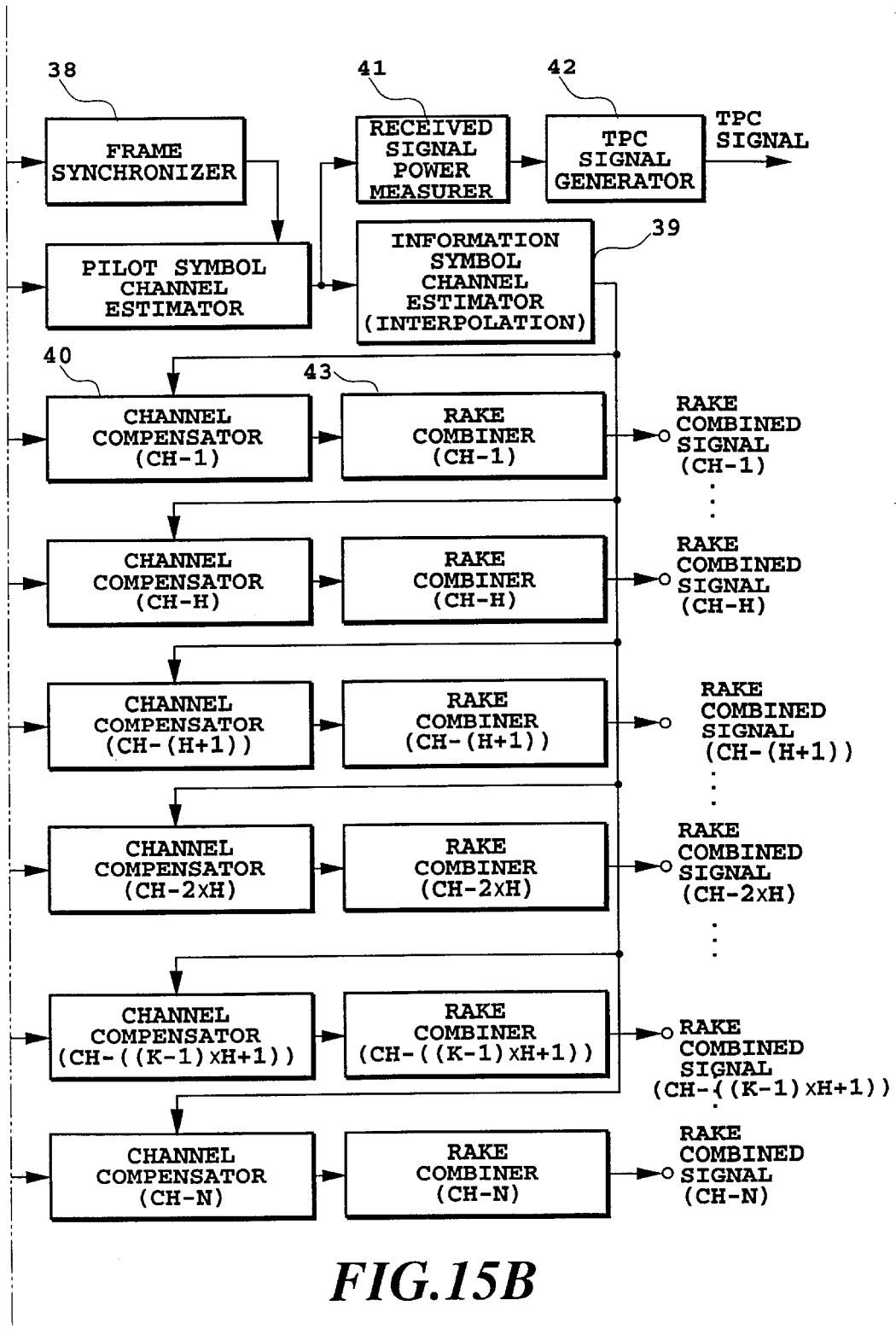
FIG. 15B is a block diagram showing another configuration of the embodiment of the receiver in the DS-CDMA transmission system in accordance with the present invention.
Figure 16:
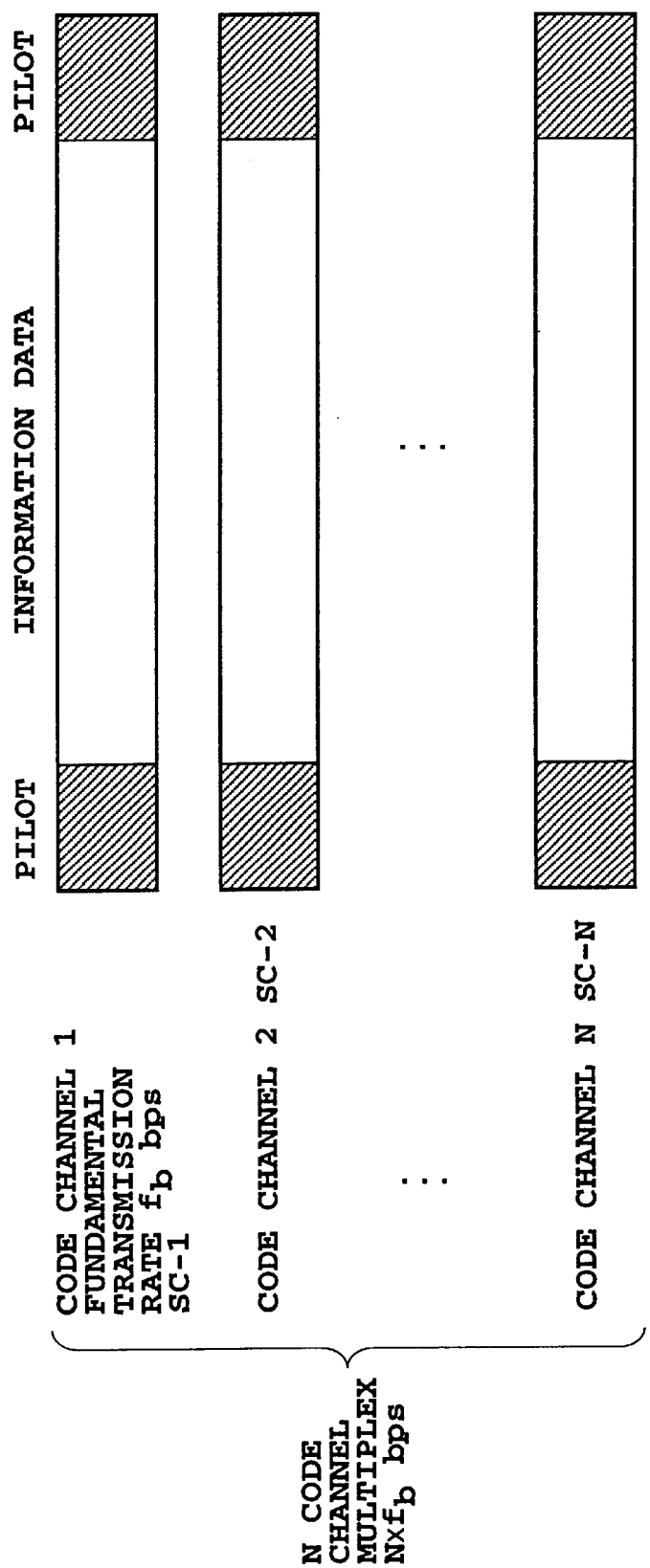
FIG. 16 is a diagram illustrating a conventional code multiplexing method.
Figure 17:
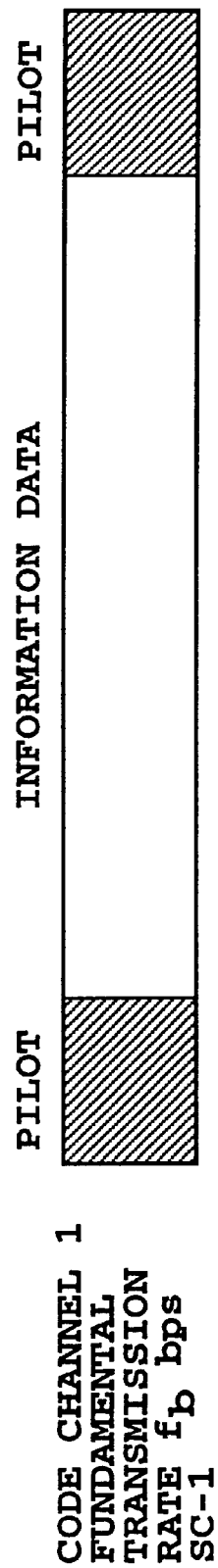
FIG. 17 is a diagram illustrating a frame structure of a single code channel transmission.
Figure 18A:
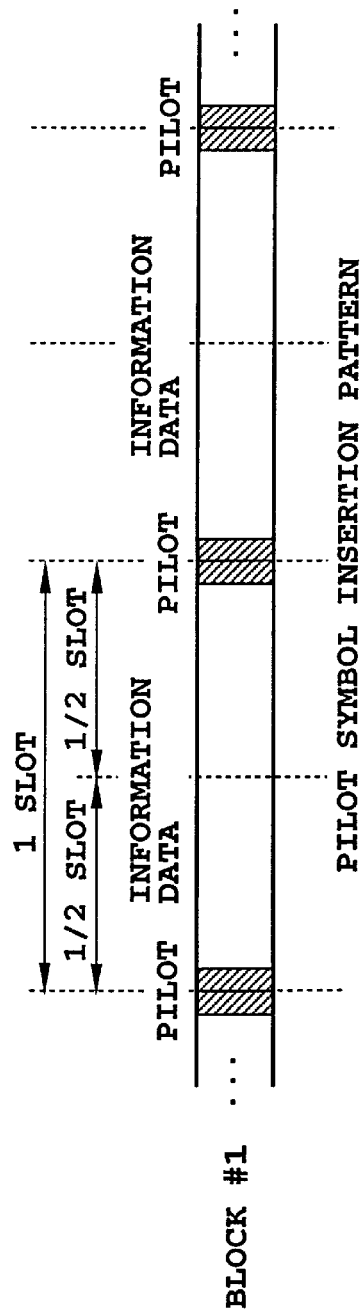
FIG. 18A is a diagram illustrating a conventional pilot symbol insertion pattern.
Figure 18B:
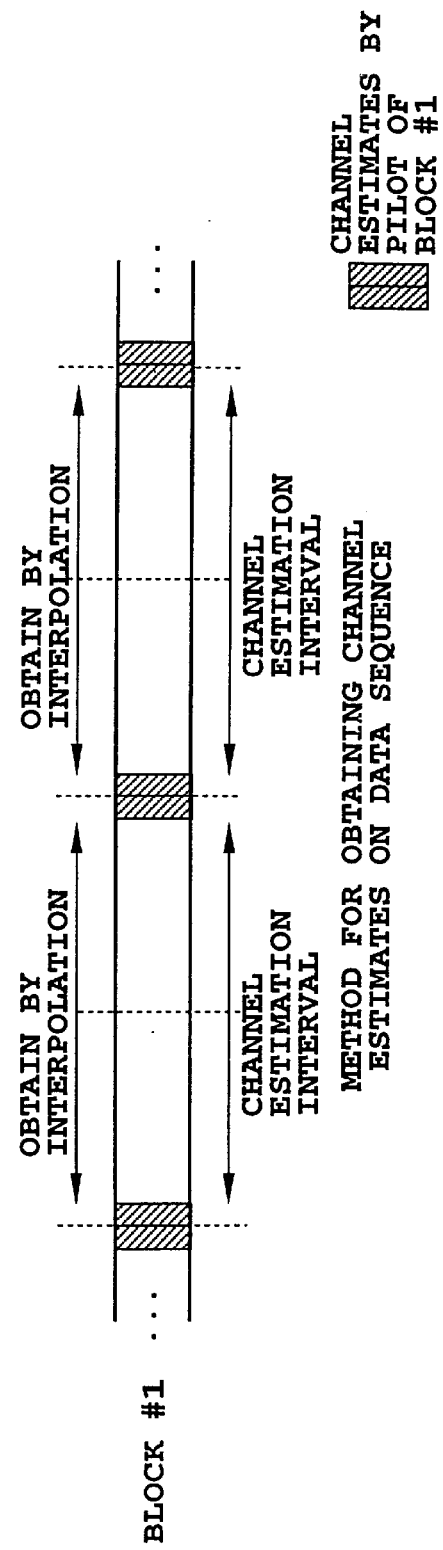
FIG. 18B is a diagram illustrating a conventional channel estimation method.
Figure 19:
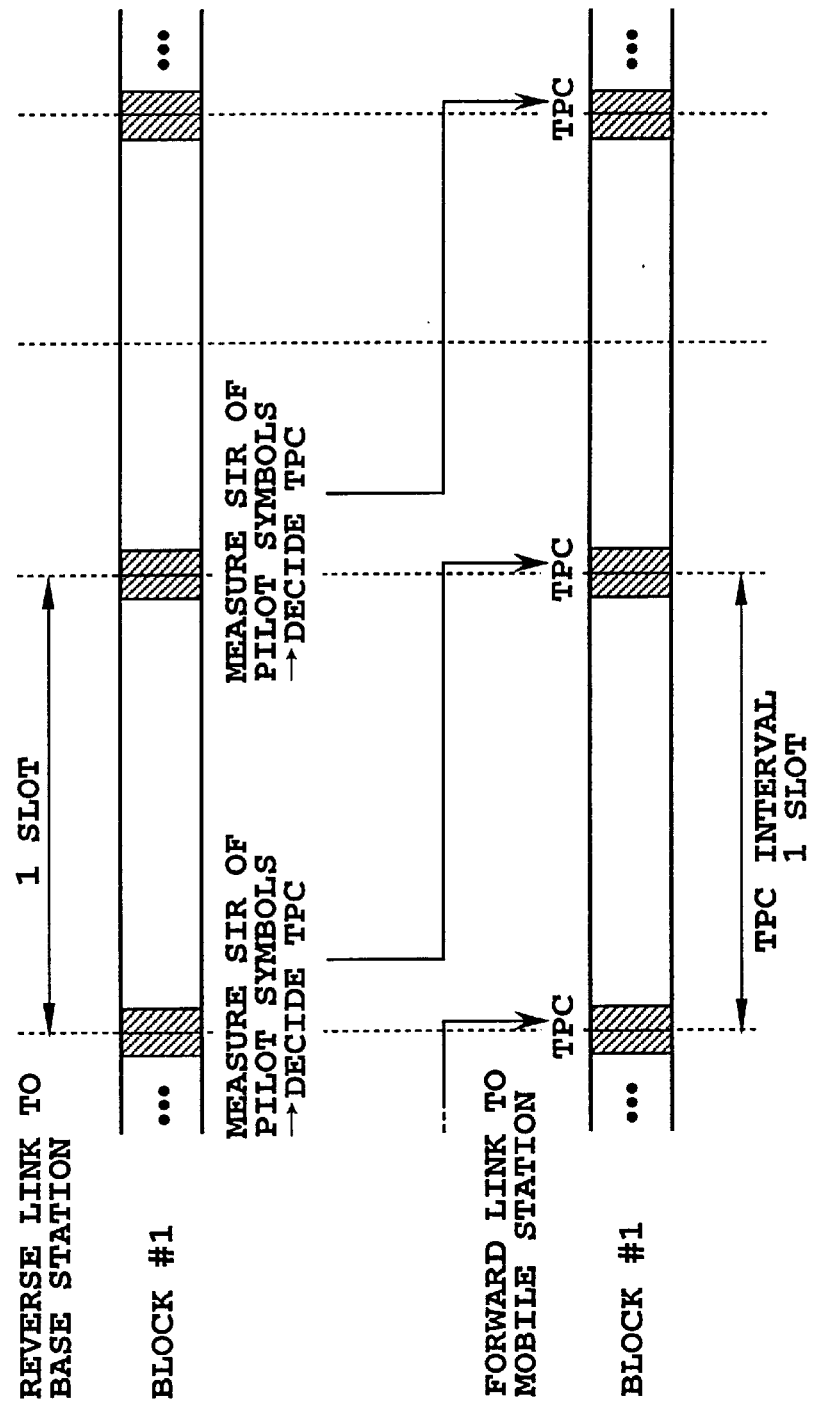
FIG. 19 is a diagram illustrating conventional transmission power control timings.

FIG. 15A and FIG. 15B are block diagrams showing a receiver of the DS-CDMA transmission system. The received spread signal is input in common to matched filters 35 corresponding to the respective spreading codes. The pilot symbols and information symbols in the code channels are despread separately for respective channels by the matched filters 35 using the spreading codes (SC-P(X)LC-Y, where P represents 1-N) as the spreading code replicas (S225). A demultiplexer (DEMUX) 36 corresponding to each code channel extracts from the information symbols the pilot symbols inserted into different positions in the respective blocks (S230). Then, the received phase of the pilot symbols is estimated by a pilot symbol channel estimator 37 which averages separately for each code channel between several pilot symbols using the output from a frame synchronizer 38 which carries out coherent detection of the pilot symbols in response to the output of the matched filter 35 (S235). The estimates of the received phase at the pilot symbol positions in each block are obtained by averaging the estimates of the received phase of the code channels in that block (S240). FIG. 12A shows a pilot symbol insertion pattern in each block. An information symbol channel estimator 39 can obtain transfer functions of the channels on the information data sequence by making interpolation at every insertion interval of the entire pilot symbols throughout the entire code channels by using, in common to all the code channels, the estimates of the received phase at the pilot symbol positions of the respective blocks as shown in FIG. 12B (S245). This can improve the tracking ability to fading in the channel estimation because of the reduced interval of the interpolation in the channel estimation. Using the signal fed from the information symbol channel estimator 39, each channel compensator 40 compensates the information symbols on the code channels fed from the demultiplexers 36 for the received phase fluctuations which are estimated using the pilot symbols (S250).

Figure 13:
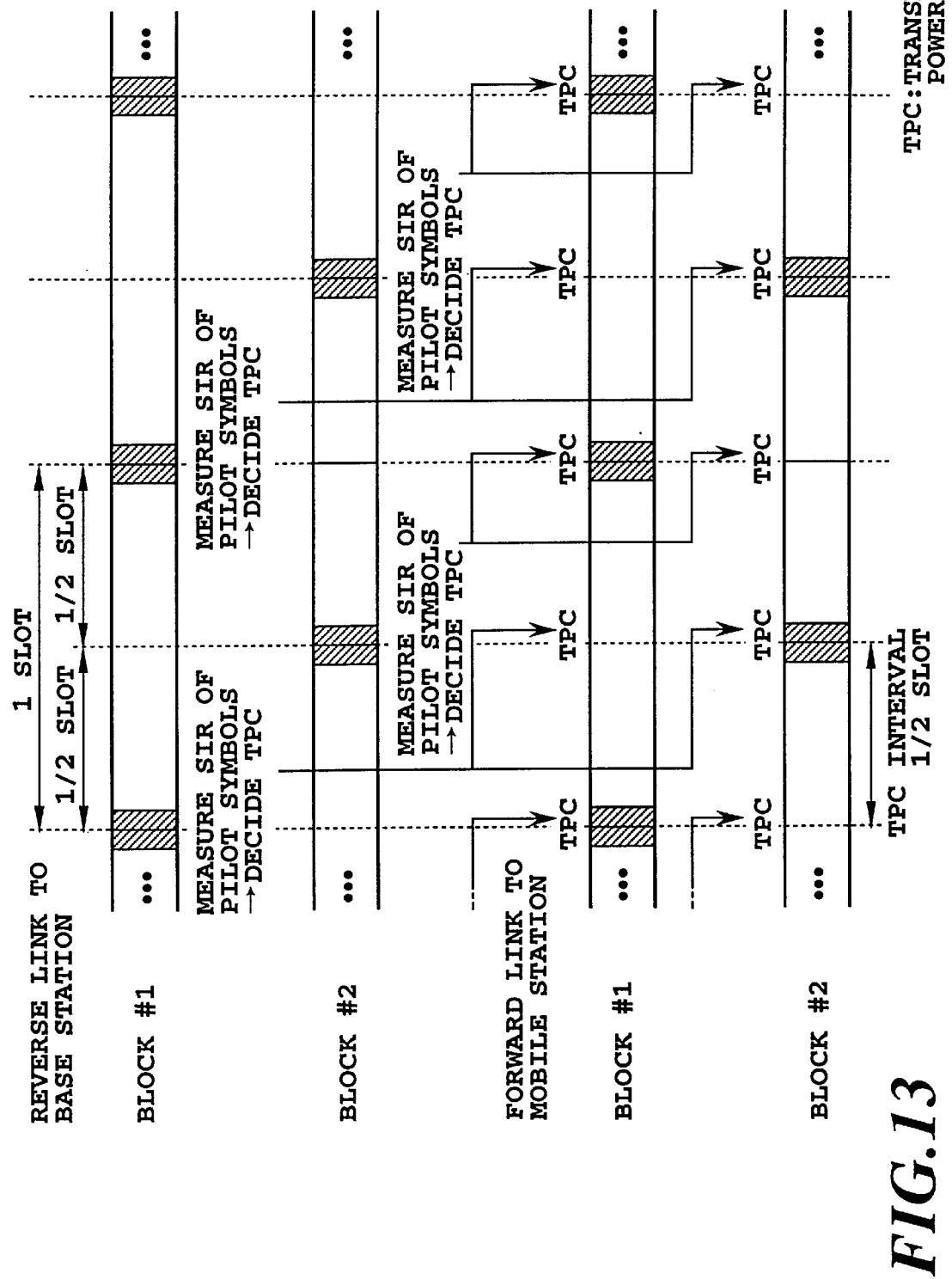
FIG. 13 is a diagram illustrating transmission power control timings (when a block number K=2) in the DS-CDMA transmission system in accordance with the present invention.

In terms of transmission power control, a received signal power measurer 41 measures the received signal power at the pilot symbol positions of each code channel on the basis of the signal fed from the pilot symbol channel estimator 37. Then, it averages in each block the measured values of the received signal power of the code channels belonging to that block, thereby obtaining the measured values of the received signal power (SIR) at the pilot symbol positions of the block. A transmission power control signal generator 42 generates a transmission power control (TPC) signal based on the measured values. The measured values of the received signal power at the pilot symbol positions in respective blocks are used in common to the entire code channels as shown in FIG. 13. This makes it possible to achieve the transmission power control at the insertion intervals of the entire pilot symbols inserted into all the code channels, and hence to improve the fading tracking ability in the transmission power control because of the virtually reduced transmission power control period.

In a multipath configuration, the phase estimator and compensator (37, 38, 39 and 40), which use pilot channels corresponding to N code channels as shown in FIG. 15, are used for each multipath to be combined. The information symbols from respective paths which have been compensated for the fading phase fluctuations by each channel compensator 40 are RAKE combined by each RAKE combiner 43 which sums up the multipath components using estimated received complex envelopes of individual paths as weights. The RAKE combined signals are each input to an error correcting decoder as shown in FIG. 7. Its operation and the deinterleave method (FIG. 9B) are the same as those of the embodiment 1.

What is claimed is:

1. A DS-CDMA transmission method using a code multiplexing method which transmits a transmission signal generated by code multiplexing through a plurality of code channels, said DS-CDMA transmission method comprising the steps of:
    coding an input data sequence, distributing the coded input data sequence to a plurality of data sequences in said plurality of code channels, and carrying out interleaving for each of said plurality of said data sequences to which the coded input data sequence has been distributed;
    assembling frames for one of said code channels by adding pilot symbols to said interleaved data symbols in said data sequence at fixed intervals, said pilot symbols being used for channel estimation for coherent detection, and assembling frames for one or more code channels other than said one of said code channels including said interleaved data symbols without adding the pilot symbols; and
    spreading said interleaved data symbols in each of said plurality of code channels using a spreading code peculiarly assigned to said each of said plurality of code channels, said spreading code being selected from a group of orthogonal spreading codes that are orthogonal to each other, and spreading said pilot symbols, which are included in only one channel of said plurality of code channels, using one of the spreading codes being selected from said spreading codes assigned to said interleaved data symbols in said plurality of code channels, or any of the spreading codes from said group of orthogonal spreading codes other than the spreading codes assigned to said interleaved data symbols in said plurality of code channels.

2. The DS-CDMA transmission method as claimed in claim 1, wherein the spreading is performed such that the transmission signal is transmitted at the same transmission rate over each of said plurality of code channels.

3. The DS-CDMA transmission method as claimed in claim 1, wherein said interleaving is carried out by writing data symbols and then reading the data symbols in a direction perpendicular to the direction in which the data symbols have been written.

4. A DS-CDMA transmission method using a code multiplexing method which transmits a transmission signal generated by code multiplexing through the N code channels (N=>2), said DS-CDMA transmission method comprising the steps of:
    coding an input data sequence, distributing the coded input data to N data sequences in said N code channels, and carrying out interleaving for each of said N data sequences to which the coded input data sequence has been distributed;
    assembling frames for respective of said N code channels by adding pilot symbols to said interleaved data symbols at the same bit position of M code channels (1<=M<=N) among the N code channels, said pilot symbols being used for channel estimation for coherent detection, and assembling frames for (N−M) code channels other than said M code channels including said interleaved data symbols without adding the pilot symbols; and
    spreading said interleaved data symbols in each of said N code channels using a spreading code peculiarly assigned to said each of said N code channels, said spreading code being selected from a group of orthogonal spreading codes that are orthogonal to each other, and spreading said pilot symbols, which are included in said M code channels, using the same one code being selected from the spreading codes assigned to said interleaved data symbols in said N code channels, or any of the spreading codes from said group of orthogonal spreading codes other than the spreading codes assigned to said interleaved data symbols in said N code channels.

5. A DS-CDMA transmission apparatus using a code multiplexing method which transmits a transmission signal generated by code multiplexing through a plurality of code channels, said DS-CDMA transmission apparatus comprising:
    an encoder for coding input data;
    a distributor for distributing the coded input data to said plurality of code channels;
    a plurality of interleavers for carrying out interleaving for each of said plurality of code channels to which the coded input data has been distributed;

a first frame assembler for assembling frames for one of said code channels by adding pilot symbols to data symbols at fixed intervals, said pilot symbols being used for channel estimation for coherent detection;

one or more second frame assemblers for assembling frames for one or more code channels other than said one of said code channels without adding pilot symbols;

a first spreading modulator for spreading said data symbols and said pilot symbols included in only one channel of said plurality of code channels, said data symbols are spread using a spreading code being selected from a group of orthogonal spreading codes that are orthogonal to each other, said pilot symbols are spread using one of the spreading codes being selected from spreading codes assigned to data symbols in said plurality of code channels, or any of the spreading codes from said group of orthogonal spreading codes other than the spreading codes assigned to said data symbols in said plurality of code channels; and one or more second spreading modulators for spreading said data symbols in each of said plurality of code channels using a spreading code peculiarly assigned to said each of said plurality of code channels, said spreading code being selected from said group of orthogonal spreading codes.

6. A DS-CDMA transmission apparatus using a code multiplexing method which transmits a transmission signal generated by code multiplexing through, the N code channels (N=>2), said DS-CDMA transmission apparatus comprising:

an encoder for coding input data;

a distributor for distributing the coded input data to said N code channels;

N interleavers for carrying out interleaving for each of said N code channels to which the coded input data has been distributed;

M first frame assemblers (1<=M<=N) for assembling frames for M code channels among the N code channels by adding pilot symbols to the data symbols at the same bit position of the M code channels, said pilot symbols being used for channel estimation for coherent detection;

(N–M) second frame assemblers for assembling frames for (N–M) code channels other than said M code channels without adding pilot symbols;

M first spreading modulators for spreading said pilot symbols and said data symbols included in said M code channels, said pilot symbols are spread using the same one spreading code being selected from spreading codes assigned to data symbols in said N code channels or any of the spreading codes other than the spreading codes assigned to said data symbols in said N code channels from a group of orthogonal spreading codes that are orthogonal to each other and said data symbols are spread using spreading codes peculiarly assigned to said each of said M code channels, said spreading code being selected from said group of orthogonal spreading codes; and (N–M) second spreading modulators for spreading said data symbols in each of said (N–M) code channels using a spreading code peculiarly assigned to said each of said (N–M) code channels, said spreading code being selected from said group of orthogonal spreading codes.

* * * * *